US011438510B2

(12) United States Patent
Chun

(10) Patent No.: US 11,438,510 B2
(45) Date of Patent: Sep. 6, 2022

(54) SYSTEM AND METHOD FOR EDITING VIDEO CONTENTS AUTOMATICALLY TECHNICAL FIELD

(71) Applicant: JAM2GO, INC., Seoul (KR)

(72) Inventor: Sol Jee Chun, Seoul (KR)

(73) Assignee: Jung Yoon Chun, Seoul (KR)

( * ) Notice: Subject to any disclaimer, the term of this patent is extended or adjusted under 35 U.S.C. 154(b) by 0 days.

(21) Appl. No.: 16/087,167

(22) PCT Filed: Mar. 22, 2017

(86) PCT No.: PCT/KR2017/003062
§ 371 (c)(1),
(2) Date: Sep. 21, 2018

(87) PCT Pub. No.: WO2017/164640
PCT Pub. Date: Sep. 28, 2017

(65) Prior Publication Data
US 2019/0364211 A1 Nov. 28, 2019

(30) Foreign Application Priority Data

Mar. 22, 2016 (KR) .................. 10-2016-0034287
Apr. 21, 2016 (KR) .................. 10-2016-0048882

(51) Int. Cl.
*H04N 5/232* (2006.01)
*G06V 20/40* (2022.01)
(Continued)

(52) U.S. Cl.
CPC ......... *H04N 5/23277* (2013.01); *G06V 20/46* (2022.01); *G11B 27/034* (2013.01); *H04N 5/144* (2013.01)

(58) Field of Classification Search
USPC ................................................ 386/278–290
See application file for complete search history.

(56) References Cited

U.S. PATENT DOCUMENTS 4,787,073 A 11/1988 Masaki
6,014,183 A * 1/2000 Hoang ............... H04N 5/147
348/700
(Continued)

FOREIGN PATENT DOCUMENTS

JP 2002-232839 A 8/2002
JP 2011-124681 A 6/2011
(Continued)

OTHER PUBLICATIONS

International Search Report and Written Opinion issued in PCT/KR2017/003062, dated Jun. 30, 2017; ISA/KR.
(Continued)

*Primary Examiner* — Hung Q Dang
(74) *Attorney, Agent, or Firm* — Harness, Dickey & Pierce, P.L.C.

(57) ABSTRACT

Provided is a system for editing video contents automatically, the system including an input interface module configured to receive a user input; a video sequence setting module configured to define a set of consecutive frames of original video content as a single original video sequence in response to receiving a video edit activation input from the input interface nodule, and to divide the original video content into a first original video sequence to an n-th original video sequence, n denoting an integer greater than or equal to 2; a video sequence shuffling module configured to create shuffled video content by randomly shuffling a subset video sequence including at least a portion of a k-th original video sequence to follow after a (k+1)-th original video sequence or to precede a (k−1)-th original video sequence, k denoting an integer greater than or equal to 1 and less than or equal to n−1; and a shuffled video content storage module configured to store sequence arrangement information that is information about the shuffled video content or arrangement (Continued)

order of video sequences of the shuffled video content and the subset video sequence.

15 Claims, 10 Drawing Sheets

(51) Int. Cl.
    *G11B 27/034*     (2006.01)
    *H04N 5/14*     (2006.01)
    *H04N 21/44*     (2011.01)
    *H04N 21/845*     (2011.01)

(56) References Cited

U.S. PATENT DOCUMENTS

| | | | |
|---|---|---|---|
| 7,024,020 | B2 | 4/2006 | Lee et al. |
| 7,904,813 | B1 | 3/2011 | Takahashi et al. |
| 8,315,507 | B2 | 11/2012 | Ishikawa |
| 9,058,841 | B2 | 6/2015 | Kulkarni et al. |
| 9,280,542 | B2 | 3/2016 | Oules |
| 2002/0097893 | A1 | 7/2002 | Lee et al. |
| 2008/0184120 | A1* | 7/2008 | Obrien-Strain ...... G11B 27/326 715/723 |
| 2011/0026901 | A1* | 2/2011 | Kashima ............. G11B 27/034 386/282 |
| 2012/0096357 | A1* | 4/2012 | Folgner .................. G11B 27/34 715/726 |
| 2014/0321831 | A1* | 10/2014 | Olsen ................... H04N 21/475 386/241 |
| 2014/0376887 | A1* | 12/2014 | Tijssen .................. G11B 27/34 386/282 |

FOREIGN PATENT DOCUMENTS

| | | |
|---|---|---|
| KR | 10-2005-0003690 A | 1/2005 |
| KR | 10-2009-0013436 A | 2/2009 |

OTHER PUBLICATIONS

Content Xlerator. Magisto App Video Review [2015], YouTube [online], Jul. 7, 2007. Retrieved from the Internet: <URL: https://www.youtube.com/watch?v=DGdZ4ecr35E&t=46s>. See pp. 1-4.

U.S. Appl. No. 15/741,461, filed Jan. 2, 2018, Chun et al.

* cited by examiner

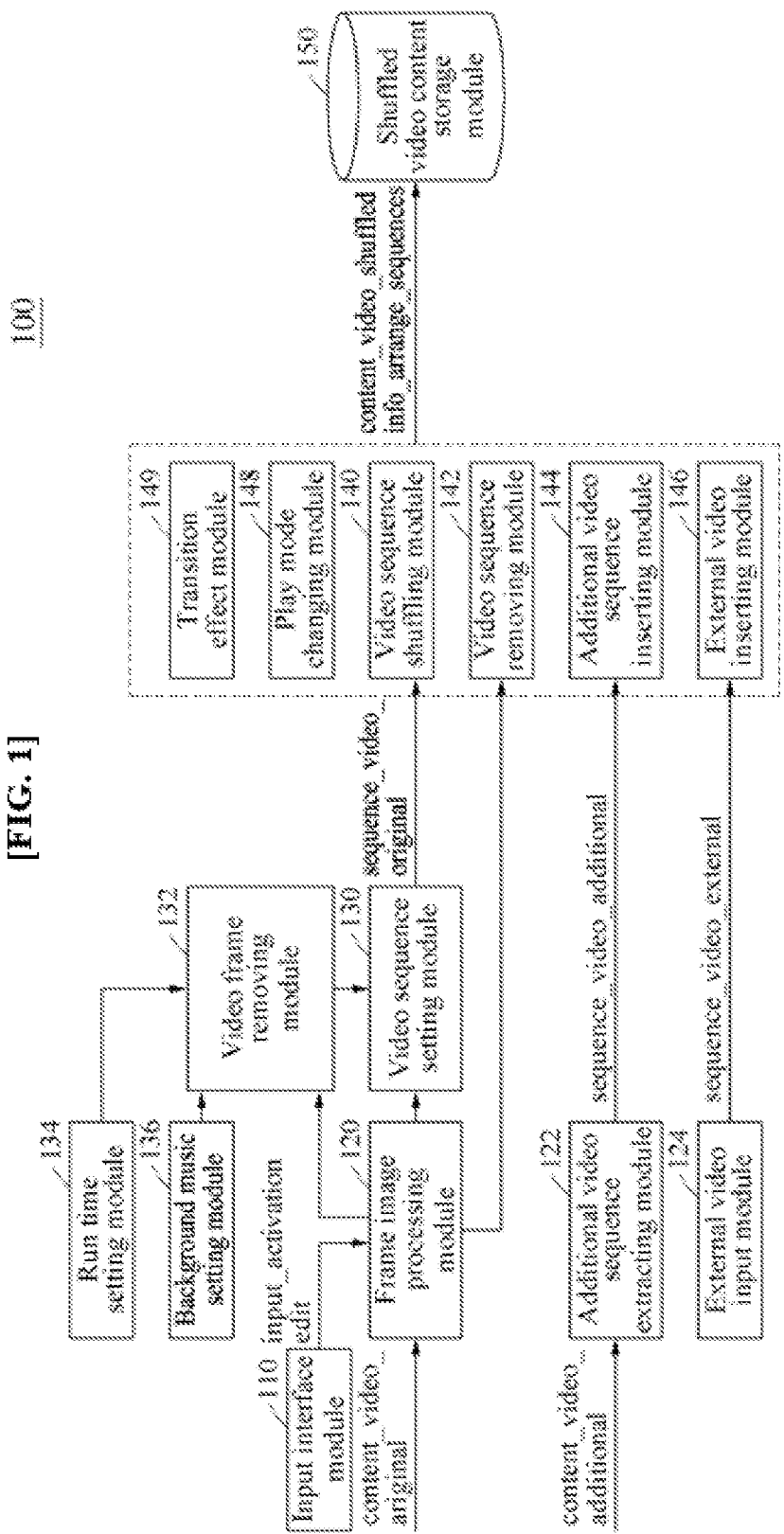
[FIG. 1]

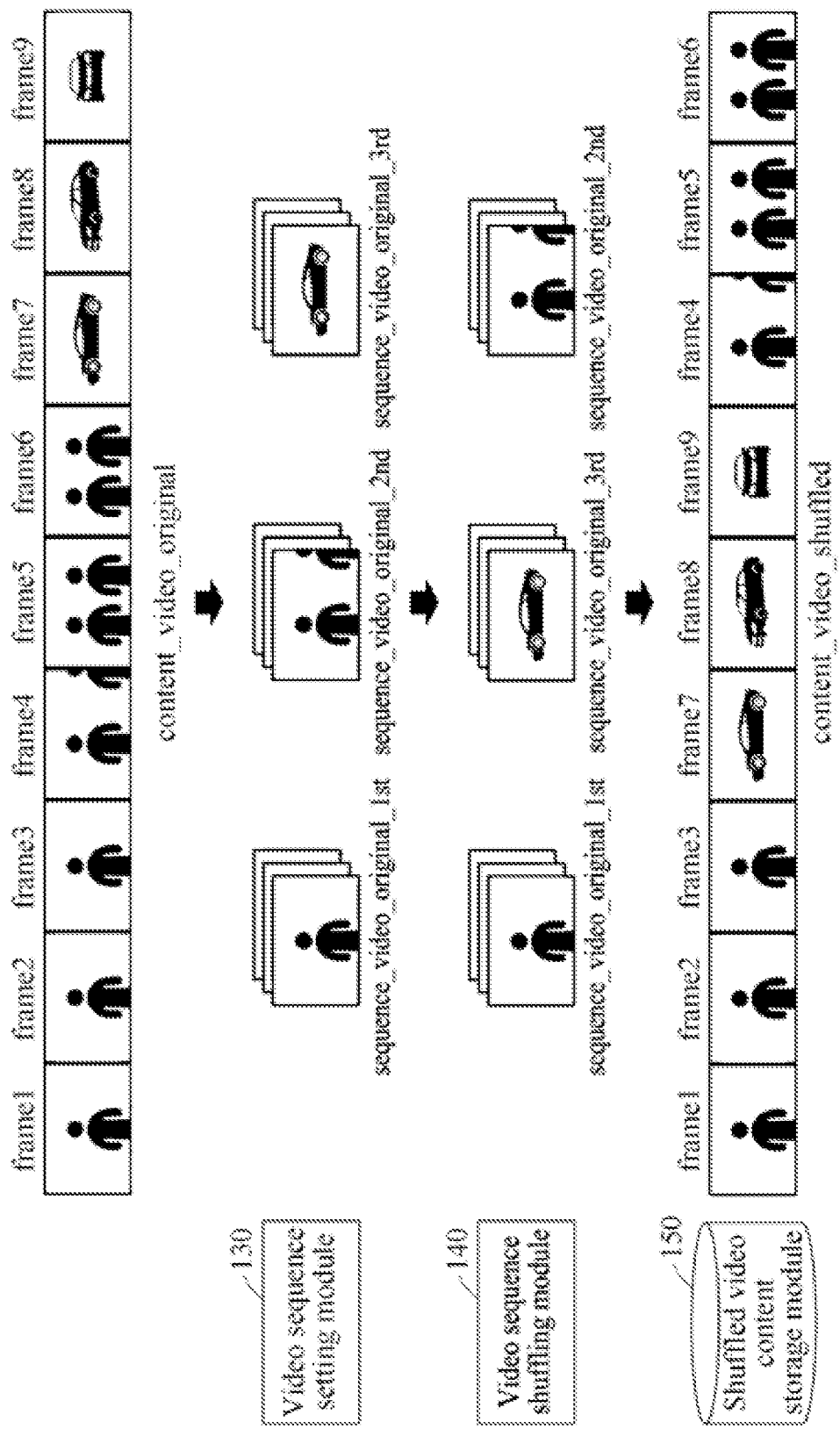
[FIG. 2]

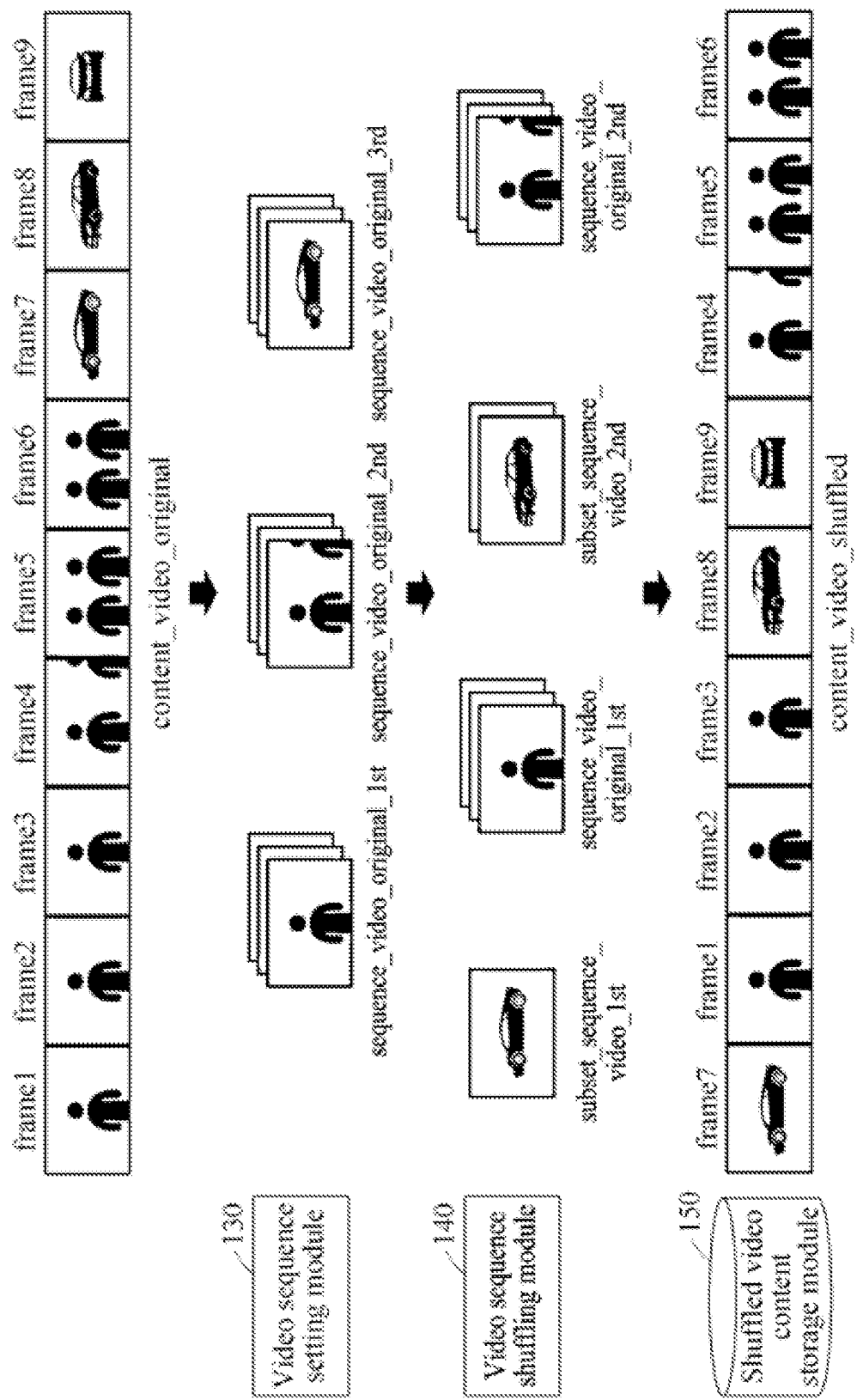

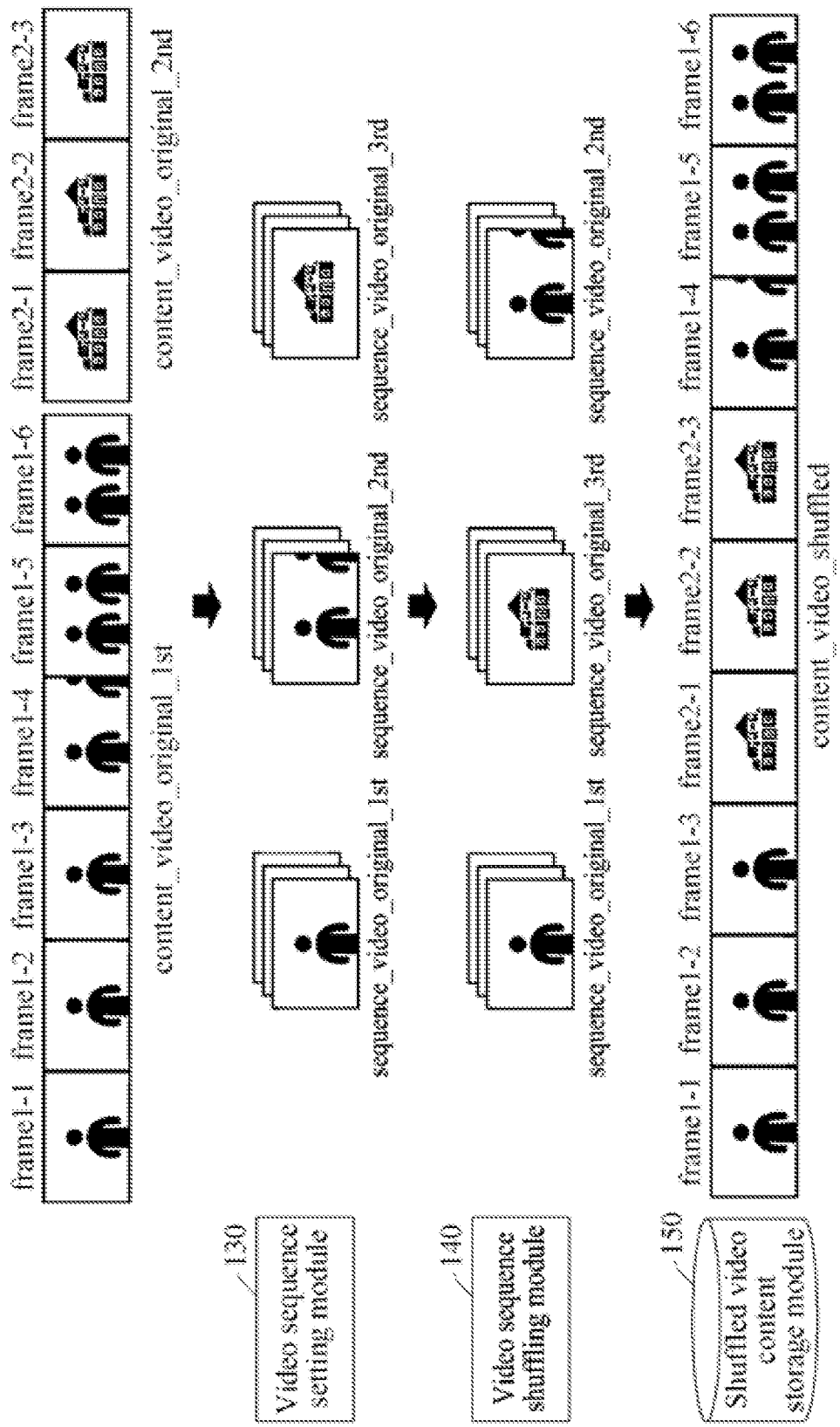
[FIG. 4]

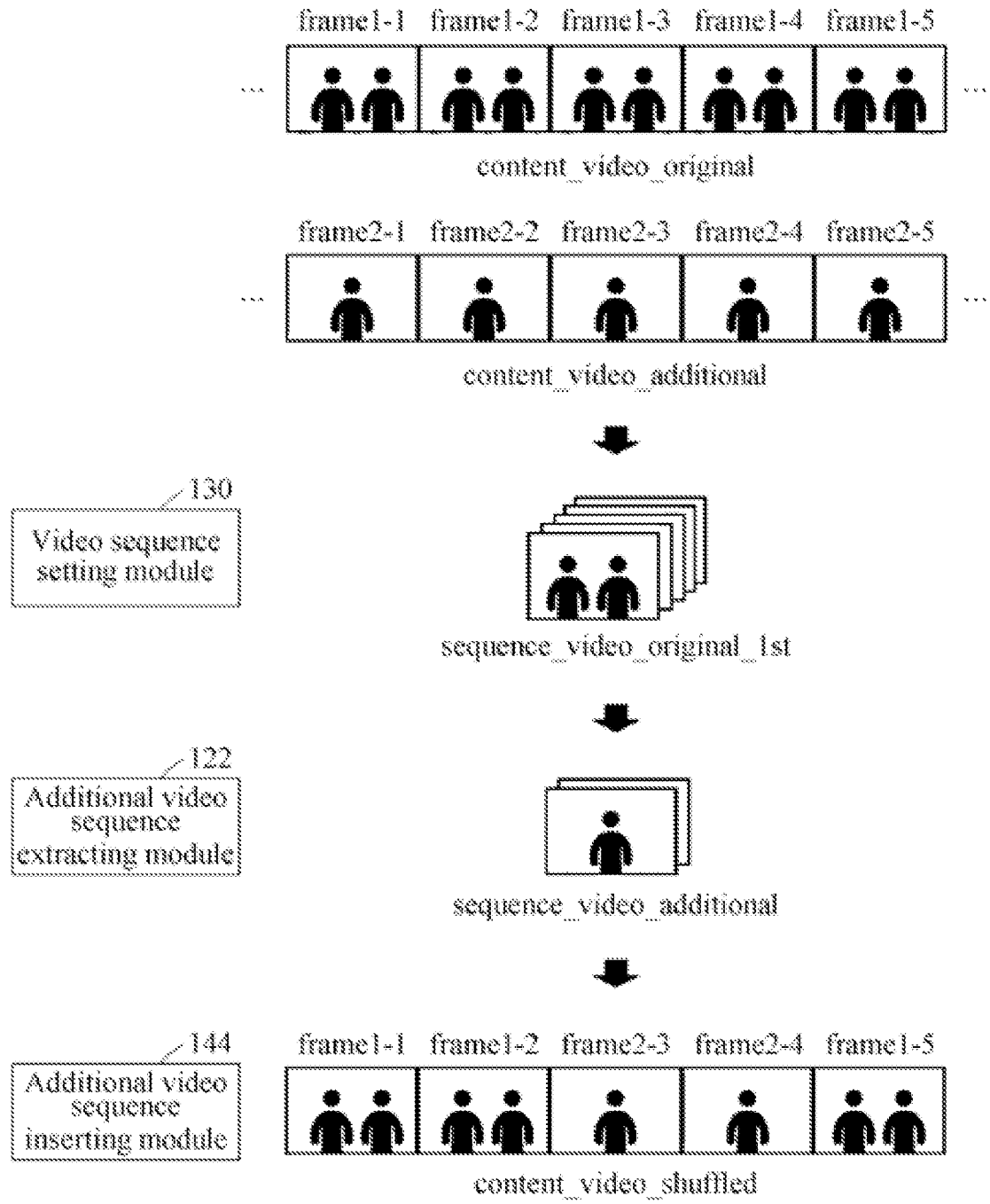

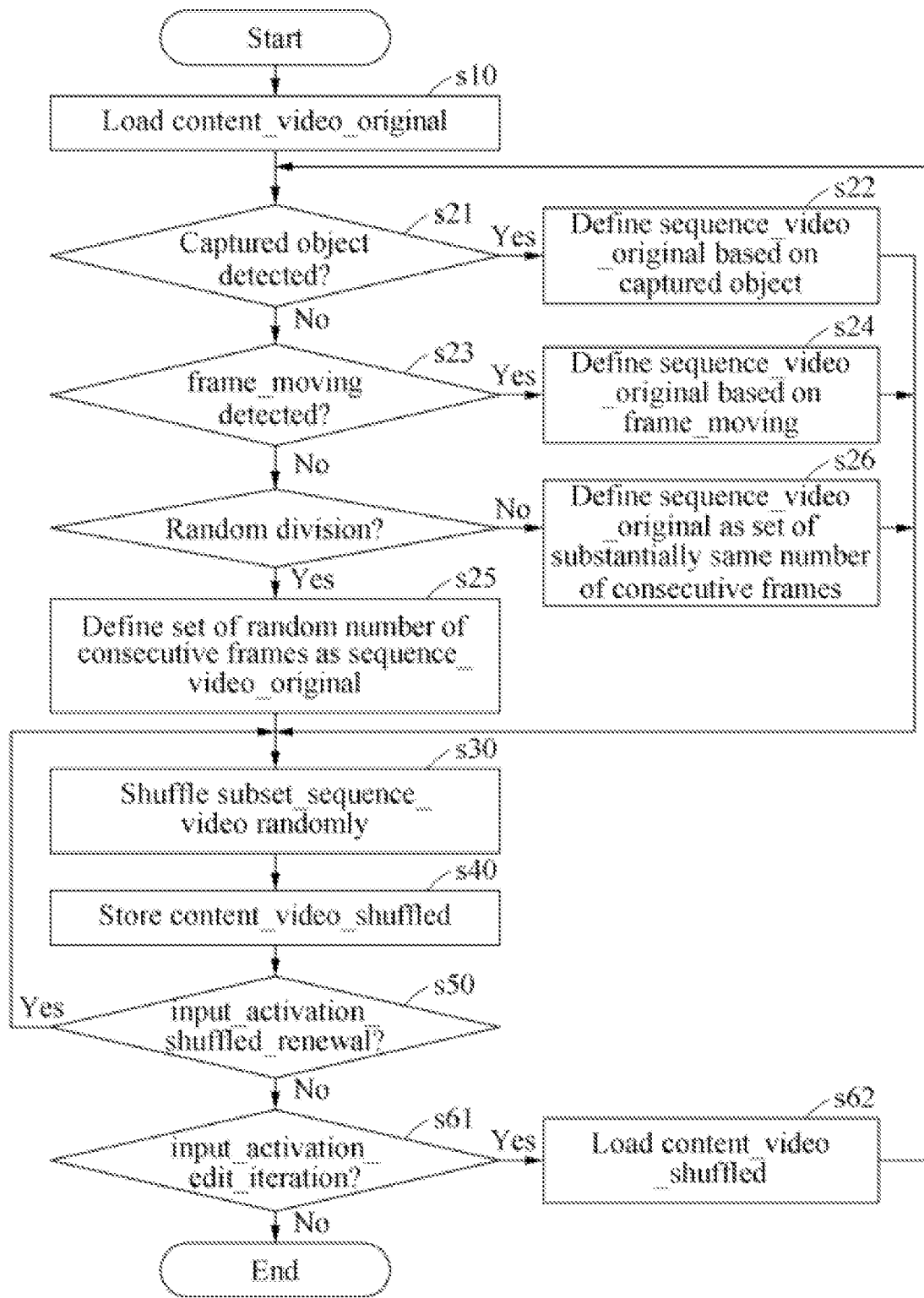
[FIG. 6]

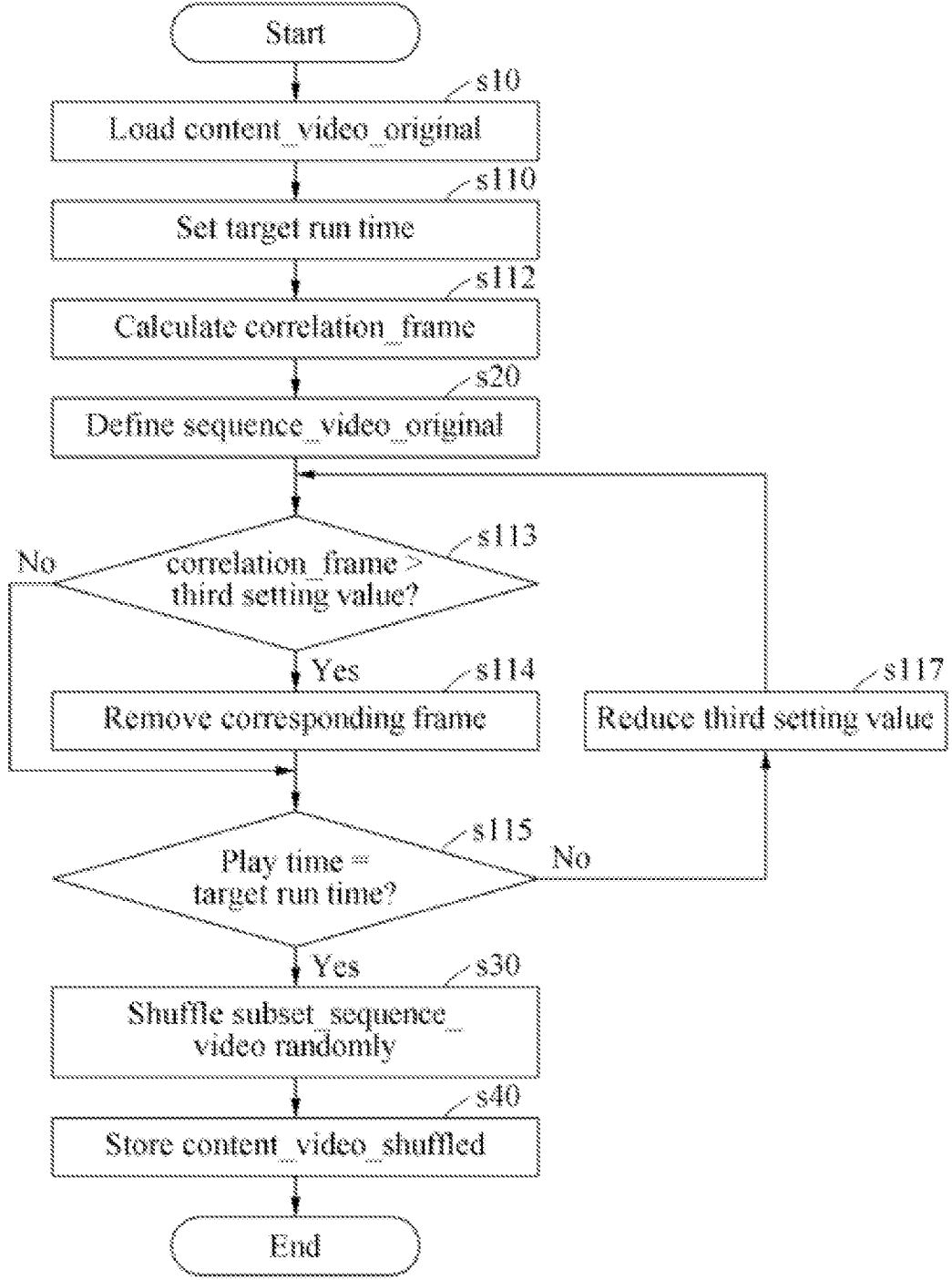
[FIG. 7]

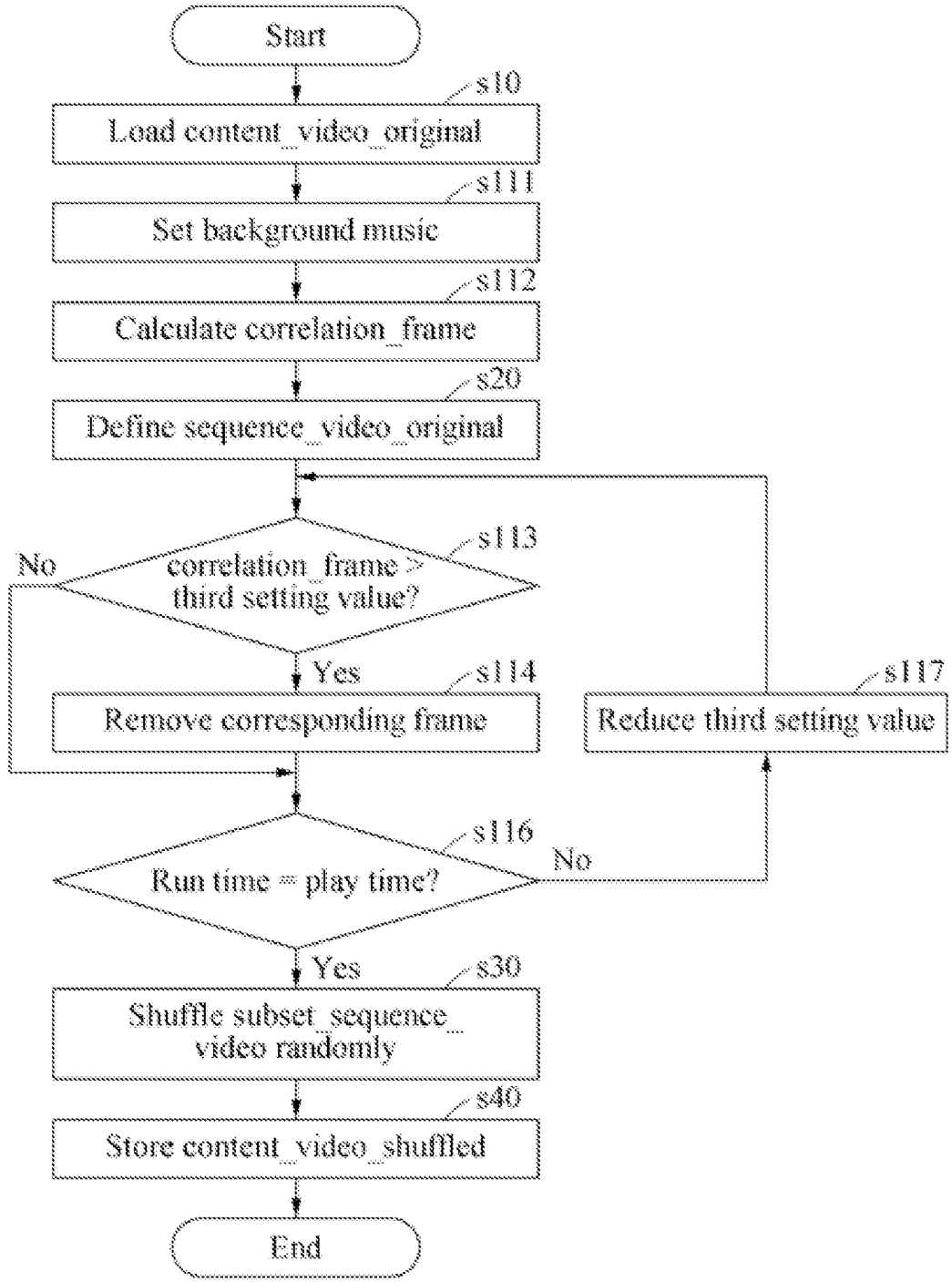
[FIG. 8]

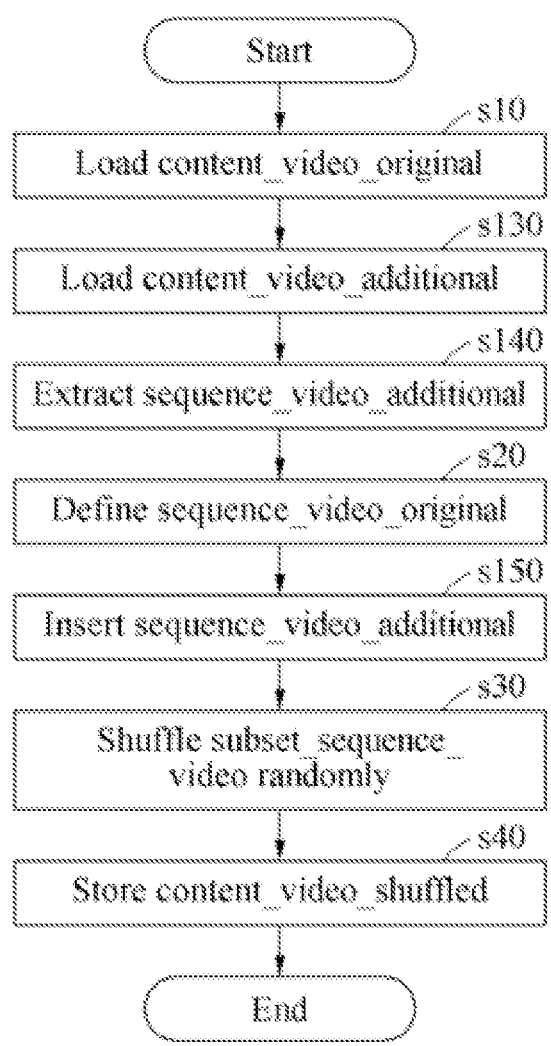

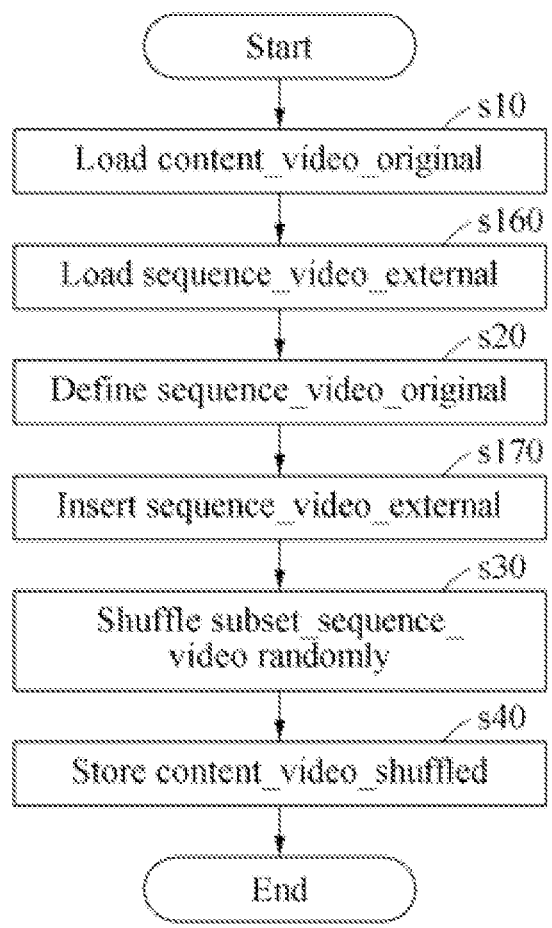
[FIG. 10]

SYSTEM AND METHOD FOR EDITING VIDEO CONTENTS AUTOMATICALLY

TECHNICAL FIELD

CROSS REFERENCE TO RELATED APPLICATIONS

This application is a 371 U.S. National Stage of International Application No. PCT/KR2017/003062, filed Mar. 22, 2017 and published in English as WO 2017/164640 A1 on Sep. 28, 2017. This application claims the benefit of Korean Application No. 10-2016-0034287, filed on Mar. 22, 2016, and Korean Application No. 10-2016-0048882, filed Apr. 21, 2016. The disclosure of each of the above-identified applications is incorporated herein by reference.

TECHNICAL FIELD

At least one example embodiment relates to a system and method for editing video contents automatically, and more particularly, a system and method for editing video contents automatically that may create new shuffled video content automatically through a dividing of video sequences and shuffling of divided video sequences.

BACKGROUND ART

With the development of an image sensor and imaging processing technology, a camera function of a smartphone carried by an individual is improved and a user may create high-definition video content using the camera function. However, although the video quality of the video content created by the user is enhanced, it is still difficult for a general user without using professional photographing techniques and professional editing techniques to produce high-quality video content.

Video content created and edited by a professional photographer may be of high video quality through a stable camera work, and elimination of unnecessary parts through editing may enhance a level of immersion of users viewing the video content. Further, the dynamics of video content may be enhanced by synchronizing and cross-editing images captured using a plurality of cameras. On the contrary, in the case of video content created by a general user, the dynamics of the video content may be of low quality since a camera angle may be continuously monotonous. In addition, it may be difficult for a user viewing the video content to remain immersed in the video content since editing, such as eliminating unnecessary parts, cross-editing, etc. may not have been performed.

In the case video contents are created by a photographer who is a general user, due to low video quality, the video contents may not attract the interest of the photographer, or third parties who view the video contents. Thus, the video contents may be forgotten and just use up the storage capacity of a storage device of a smartphone, etc. or may be deleted from the storage device to free up the storage capacity.

In the meantime, although programs and applications that allow users to edit video contents relatively easily have been developed and commercialized, there are still only a small number of users who edit their video contents. That is, many general users do not have professional editing equipment and still need to experience a process of setting an edit section of video content through a limited user interface, such as a touch screen of a smartphone, and setting an edit location, which is regarded to be complex and inconvenient.

U.S. Pat. No. 9,058,841 of Samsung Electronics Co. Ltd. titled "Method and system for editing video sequences", discloses an automatic editing method of adding a decorative object, such as a balloon image or a candle image, at a random position randomly. By this method, without an editing operation that allows a user to manually add a decorative object, corresponding elements may be randomly added to video content and the unexpectedness and dynamics of the video content may be slightly improved. However, this adding is merely inserting an additional and decorative element into a frame rather than editing by moving or deleting a video sequence itself from the video content. Accordingly, this method is still insufficient to change attributes of video content that is fundamentally boring.

U.S. Pat. No. 8,315,507 of NEC corporation, titled "Video generation device, video generation method, and video generation program", discloses a method of creating new video content based on an appearance ratio set by calculating an actual appearance ratio based on an amount of time in which an object appears in original video content. By this method, it is possible to edit new video content automatically according to a predetermined rule, such as the appearance ratio. However, in video contents created by general users, many persons rarely appear as they would in a movie or a drama. In many cases, the same object, for example, the same person or scenery, etc., appears only for a relatively short run time of several seconds to several tens of minutes. Accordingly, editing according to the appearance ratio cannot be performed on or is meaningless for much of video contents created by users.

U.S. Pat. No. 7,904,813, titled "Method for editing video information and editing device", and U.S. Pat. No. 7,627,823, titled "Video information editing method and editing device", filed by Sony Corporation, disclose a method of extracting semantic evaluation information of each of scenes from original video content, such as a movie, and creating an appropriate preview video automatically. By this method, temporally compressed edited video content may be acquired through automatic editing. However, for much of video contents created by general users, it is difficult to acquire semantic evaluation information because there is no distinction between scenes and contextually sudden change is insufficient.

U.S. Pat. No. 4,787,073 of Pioneer Electronics Corporation, titled "Data play system for random selection" discloses a system for selecting a plurality of audio contents stored in each of a plurality of disks randomly. By this system, since audio contents are provided to a user in random order, the user may experience an unexpected selection of music when the user is listening to music. However, this system merely determines the play order of a plurality of audio contents randomly and does not change the contents of the completed content and thus, this system has some constraints as to the extent to which this system may provide newly edited content to the user.

DISCLOSURE OF INVENTION

Technical Problem

At least one example embodiment provides a system and method for editing video contents automatically that may improve a user convenience in editing video contents by dividing original video content into a plurality of original video sequences automatically and shuffling a subset video sequence randomly, and by setting an automatic editing section and an automatic video sequence moving point without an additional input of a user, and may enhance the dynamics and unexpectedness of automatically edited video content by creating shuffled video content beyond the expectation of the user.

At least one example embodiment also provides a system and method for editing video contents automatically that may motivate a user to reuse video content and may further enhance the dynamics and unexpectedness of automatically edited video content by creating a single piece of shuffled video content using a plurality of original video contents.

At least one example embodiment also provides a system and method for editing video contents automatically that may motivate a user to reuse video content and may further enhance the dynamics and unexpectedness of automatically edited video content by easily creating a second shuffled video content using original video content in response to a selection of the user after the automatically edited shuffled video content is created randomly.

At least one example embodiment also provides a system and method for editing video contents automatically that may motivate a user to reuse video content and may further enhance the dynamics and unexpectedness of automatically edited video content by editing shuffled video content as new original video content randomly and automatically in response to a selection of a user after the automatically edited shuffled video content is created randomly.

At least one example embodiment also provides a system and method for editing video contents automatically that may provide automatically edited video content, which adaptively meets various intents of a user, by adjusting an editing level randomly in response to a selection of a user on, for example, a touch time sensed at a touch sensing module, a touch pressure, or a shake time sensed at a motion sensing module, shake intensity, etc.

At least one example embodiment also provides a system and method for editing video contents automatically that may enhance the immersion of a user and may enhance the dynamics of automatically edited video content by removing unnecessarily continuous static scenes automatically and thereby enhancing the video quality of the automatically edited video content.

At least one example embodiment also provides a system and method for editing video contents automatically that may enhance the immersion of a user and may enhance the dynamics of automatically edited video content by creating shuffled video content to meet a set target run time or a set play time of background music and thereby enhancing the video quality of the automatically edited video content.

At least one example embodiment also provides a system and method for editing video contents automatically that may enhance the immersion of a user and may enhance the dynamics of automatically edited video content by removing an unnecessary part captured during a camera movement or a camera rotation automatically and thereby enhancing the video quality of the automatically edited video content.

At least one example embodiment also provides a system and method for editing video contents automatically that may enhance the dynamics and unexpectedness of automatically edited video content by applying a compression and play method, an extended play method, and a reverse play method to an original video sequence or a subset video sequence randomly.

At least one example embodiment also provides a system and method for editing video contents automatically that may enhance the video quality by automatically cross-editing additional video content captured in the same time as a time in which original video content is captured and by applying a camera transition effect, such as seen in professional video materials, to automatically edited video content.

At least one example embodiment also provides a system and method for editing video contents automatically that may enhance the video quality of automatically edited video content by automatically inserting another video content, a photo, etc., captured at the same location as a location at which original video content is captured into shuffled video content as an external video sequence.

At least one example embodiment also provides a system and method for editing video contents automatically that may enhance the video quality of automatically edited video content by applying a transition effect to an edited subset video sequel automatically.

Solution to Problem

According to at least one example embodiment, there is provided a system for editing video contents automatically, the system including, an input interface module configured to receive a user input; a video sequence setting module configured to define a set of consecutive frames of original video content as a single original video sequence in response to receiving a video edit activation input from the input interface module, and to divide the original video content into a first original video sequence to an n-th original video sequence, n denoting an integer greater than or equal to 2; a video sequence shuffling module configured to create shuffled video content by randomly shuffling a subset video sequence including at least a portion of a k-th original video sequence to follow after a (k+1)-th original video sequence or to precede a (k−1)-th original video sequence, k denoting an integer greater than or equal to 1 and less than or equal to n−1; and a shuffled video content storage module configured to store sequence arrangement information that is information about the shuffled video content or arrangement order of video sequences of the shuffled video content and the subset video sequence.

According to an aspect, the automatic video content editing system may further include a frame image processing module configured to perform an image analysis for each of the frames and to detect a captured object included in the frame. The video sequence setting module may be configured to define, as the single original video sequence, consecutive frames based on the captured object that is detected at the frame image processing module.

According to an aspect, the automatic video content editing system may further include a frame image processing module configured to detect camera adjustment frames that are frames captured during a camera movement or frames captured during a camera rotation. The video sequence setting module may be configured to define, as the single original video sequence, consecutive frames based on the camera adjustment frames that are detected at the frame image processing module.

According to an aspect, the video sequence setting module may be configured to define a set of the random number of consecutive frames as the single original video sequence.

According to an aspect, the video sequence setting module may be configured to define that each of the original video sequences includes a set of substantially the same number of consecutive frames.

According to an aspect, the automatic video content editing system may further include a frame image processing module configured to perform an image analysis for each of the frames. The video sequence setting module may be configured to use one or a combination of a first sequence setting method of defining, as the single original video sequence, consecutive frames based on a captured object that is detected at the frame image processing module, a second sequence setting method of defining, as the single original video sequence, consecutive frames based on camera adjustment frames that are detected at the frame image processing module, a third sequence setting method of defining a set of the random number of consecutive frames as the single original video sequence, and a fourth sequence setting method of defining that each of the single original video sequences includes a set of substantially the same number of consecutive frames.

According to an aspect, the automatic video content editing system may further include a frame image processing module configured to analyze each frame of the original video content in response to receiving the video edit activation input from the input interface module, and to calculate a frame correlation that is a correlation between consecutive frames. The video sequence setting module may be configured to define a set of consecutive frames having the frame correlation greater than or equal to a first setting value as the single original video sequence.

According to an aspect, the automatic video content editing system may further include video sequence setting module may be configured to divide a plurality of original video contents into the first original video sequence to the n-th original video sequence, and the video sequence shuffling module may be configured to create the single piece of shuffled video content.

According to an aspect, the video sequence shuffling module may be configured to create a second shuffled video content by randomly re-shuffling the subset video sequence in response to receiving an additional shuffle activation input from the input interface module after creating the shuffled video content.

According to an aspect, the video sequence setting module may be configured to divide the shuffled video content into a first original video sequence to an n-th original video sequence as new original video content in response to receiving an additional video edit activation input from the input interface module after creating the shuffled video content.

According to an aspect, the input interface module may include a touch sensing module configured to recognize a touch of a user on a display as the video edit activation input, and the video sequence setting module may be configured to change the number of frames to be included in the set of consecutive frames according to an increase or a decrease in a touch time of the user or an increase or a decrease in a touch pressure of the user.

According to an aspect, the input interface module may include a motion sensing module configured to detect a shake of a device and to recognize the detected shake as the video edit activation input, and the video sequence setting module may be configured to change the number of frames to be included in the set of consecutive frames according to an increase or a decrease in a shake time of the device or an increase or a decrease in a shake intensity.

According to an aspect, the automatic video content editing system may further include a video sequence removing module configured to remove at least one of original video sequences having a sequence correlation greater than or equal to a second setting value, the sequence correlation being a correlation between the original video sequences.

According to an aspect, the automatic video content editing system may further include a video frame removing module configured to remove a portion of frames so that a run time of the shuffled video content meets a target run time.

According to an aspect, the automatic video content editing system may further include a run time setting module configured to set a target run time of the shuffled video content; and a frame image processing module configured to analyze each frame of the original video content in response to receiving the video edit activation input from the input interface module and to calculate a frame correlation that is a correlation between consecutive frames. The video frame removing module may be configured to remove frames having the frame correlation greater than or equal to a third setting value from the k-th original video sequence or the subset video sequence to meet the target run time.

According to an aspect, a run time of background music to be included in an audio track of the shuffled video content may be applied as the target run time.

According to an aspect, the automatic video content editing system may further include a background music setting module configured to set the background music to be included in the audio track of the shuffled video content; and a frame image processing module configured to analyze each frame of the original video content in response to receiving the video edit activation input from the input interface module, and to calculate a frame correlation that is a correlation between consecutive frames. The video frame removing module may be configured to remove frames having the frame correlation greater than or equal to a third setting value from the k-th original video sequence or the subset video sequence to meet a play time of the background music.

According to an aspect, the automatic video content editing system may further include a frame image processing module configured to detect camera adjustment frames that are frames captured during a camera movement or frames captured during a camera rotation; and a video frame removing module configured to remove, from the k-th original video sequence or the subset video sequence, a camera adjustment frame that is a video frame captured during the camera movement or a frame captured during the camera rotation as an operation result of the frame image processing module.

According to an aspect, the automatic video content editing system may further include a play mode changing module configured to randomly apply at least one of a compression and play method, an extension and play method, or a reverse play method to at least one of the original video sequences or the subset video sequence.

According to an aspect, the automatic video content editing system may further include an additional video sequence extracting module configured to load additional video content captured at another camera device in a time substantially the same as a time in which the original video content is captured, and to extract at least a portion of additional video sequences of the additional video content; and an additional video sequence inserting module configured to replace the additional video sequence with at least one of the original video sequences that precede or follow after the time in which the additional video sequence is captured, or to replace the additional video sequence with a portion of frames of the original video sequence that precedes or follows after to be adjacent to the time in which the additional video sequence is captured.

According to an aspect, the additional video sequence inserting module may be configured to replace the additional video sequence by comparing a first audio signal included in the original video sequence to a second audio signal included in the additional video sequence.

According to an aspect, the additional video sequence inserting module may be configured to replace the additional video sequence by comparing first capturing time information included in the original video sequence to second capturing time information included in the additional video sequence.

According to an aspect, the automatic video content editing system may further include an external video input module configured to receive an external video sequence corresponding to a location at which the original video content is captured; and an external video inserting module configured to insert the external video sequence into the shuffled video content.

According to an aspect, the automatic video content editing system may further include a transition effect module configured to apply a transition effect to at least one of a start point or an end point of the shuffled subset video sequence.

According to at least one example embodiment, there is provided a method of editing video contents automatically, the method including a first step of receiving, by an automatic video content editing system, a video edit activation input from a user and loading, original video content; a second step of defining, by the automatic video content editing system, a set of consecutive frames as a single original video sequence and dividing the original video content into a first original video sequence to an n-th original video sequence, n denoting an integer greater than or equal to 2; a third step of randomly shuffling, by the automatic video content editing system, a subset video sequence including at least a portion of a k-th original video sequence to follow after a (k+1)-th original video sequence or to precede a (k−1)-th original video sequence, and creating sequence arrangement information that is information about arrangement order of the original video sequences and/or the subset video sequences; and a fourth step of storing, by the automatic video content editing system, the shuffled video content corresponding to the sequence arrangement information or the sequence arrangement information.

According to an aspect, the second step may include a first sub-step of performing, by the automatic video content editing system, an image analysis for each of the frames and detecting a captured object included in the frame; and a second sub-step of defining, by the automatic video content editing system, consecutive frames based on the captured object that is detected in the first sub-step as the single original video sequence.

According to an aspect, the second step may include a third sub-step of detecting, by the automatic video content editing system, camera adjustment frames that are frames captured during a camera movement or frames captured during a camera rotation; and a fourth sub-step of defining, by the automatic video content editing system, consecutive frames based on the camera adjustment frames that are detected in the first sub-step as the single original video sequence.

According to an aspect, the second step may be configured such that the automatic video content editing system defines a set of the random number of consecutive frames as the single original video sequence.

According to an aspect, the second step may be configured such that the automatic video content editing system defines that each of the original video sequences includes a set of substantially the same number of consecutive frames.

According to an aspect, the second step may include a fifth sub-step of analyzing, by the automatic video content editing system, each frame of the original video content, and calculating a frame correlation that is a correlation between consecutive frames; and a sixth sub-step of defining, by the automatic video content editing system, a set of consecutive frames having the frame correlation greater than or equal to a first setting value as the single original video sequence.

According to an aspect, the first step may be configured such that the automatic video content editing system loads a plurality of original video contents, the second step may be configured such that the automatic video content editing system divides the plurality of original video contents into the first original video sequence to the n-th original video sequence, and the third step may be configured such that the automatic video content editing system creates the single piece of shuffled video content.

According to an aspect, the automatic video content editing method may further include a fifth step of creating, by the automatic video content editing system, a second shuffled video content by randomly re-shuffling the subset video sequence in response to receiving an additional shuffle activation input from a user after the fourth step.

According to an aspect, the automatic video content editing method may further include a sixth step of performing, by the automatic video content editing system, the second step through the fourth step on the shuffled video content by receiving an additional video edit activation input from a user after the fourth step.

According to an aspect, the first step may be configured such that the automatic video content editing system receives a touch of a user on a display as the video edit activation input, and the second step may be configured such that the automatic video content editing system changes the number of frames to be included in the set of consecutive frames according to an increase or a decrease in a touch time of the user or an increase or a decrease in a touch pressure of the user.

According to an aspect, the first step may be configured such that the automatic video content editing system receives a shake of a device and as the video edit activation input, and the second step may be configured such that the automatic video content editing system changes the number of frames to be included in the set of consecutive frames according to an increase or a decrease in a shake time of the device or an increase or a decrease in a shake intensity.

According to an aspect, the automatic video content editing method may further include a seventh step of setting, by the automatic video content editing system, setting a target run time of the shuffled video content after the first step; an eighth step of analyzing, by the automatic video content editing system, each frame of the original video content in response to receiving the video edit activation input, and calculating a frame correlation that is a correlation between consecutive frames; and a ninth step of removing, by the automatic video content editing system, frames having the frame correlation greater than or equal to a third setting value from the k-th original video sequence or the subset video sequence to meet the target run time.

According to an aspect, the automatic video content editing method may further include a tenth step of setting, by the automatic video content editing system, background music to be included in an audio track of the shuffled video content after the first step; an eleventh step of analyzing, by the automatic video content editing system, each frame of the original video content in response to receiving the video edit activation input, and calculating a frame correlation between consecutive frames; and a twelfth step of removing, by the automatic video content editing system, frames having the frame correlation greater than or equal to a third setting value from the k-th original video sequence or the subset video sequence to meet a play time of the background.

According to an aspect, the third step may be configured such that the automatic video content editing system randomly applies at least one of a compression and play method, an extension and play method, or a reverse play method to at least one of the original video sequences or the subset video sequence.

According to an aspect, the automatic video content editing method may further include a thirteenth step of loading, by the automatic video content editing system, additional video content captured at another camera device in a time substantially the same as a time in which the original video content is captured after the second step, a fourteenth step of extracting, by the automatic video content editing system, at least a portion of additional video sequences of the additional video content; and a fifteenth step of replacing, by the automatic video content editing system, the additional video sequence with at least one of the original video sequences that precede or follow after the time in which the additional video sequence is captured, or replacing the additional video sequence with a portion of frames of the original video sequence that precedes or follows after to be adjacent to the time in which the additional video sequence is captured.

According to an aspect, the fifteenth step may be configured such that the automatic video content editing system replaces the additional video sequence by comparing a first audio signal included in the original video sequence to a second audio signal included in the additional video sequence.

According to an aspect, the fifteenth step may be configured such that the automatic video content editing system replaces the additional video sequence by comparing first capturing time information included in the original video sequence to second capturing time information included in the additional video sequence.

According to an aspect, the automatic video content editing method may further include a sixteenth step of loading, by the automatic video content editing system, an external video sequence corresponding to a location at which the original video content is captured after the second step; and a seventeenth step of inserting, by the automatic video content editing system, the external video sequence into the original video content.

According to an aspect, the third step may be configured such that the automatic video content editing system applies a transition effect to at least one of a start point or an end point of the shuffled subset video sequence.

Advantageous Effects of Invention

A system and method for editing video contents automatically according to example embodiments may improve a user convenience in editing video content by dividing original video content into a plurality of original video sequences automatically and shuffling a subset video sequence randomly, and by setting an automatic editing section and an automatic video sequence moving point without an additional input of a user, and may enhance the dynamics and unexpectedness of automatically edited video content by creating shuffled video content beyond the expectation of the user.

A system and method for editing video contents automatically according to example embodiments may motivate a user to reuse video content and may further enhance the dynamics and unexpectedness of automatically edited video content by creating a single piece of shuffled video content using a plurality of original video contents.

A system and method for editing video contents automatically according to example embodiments may motivate a user to muse video content and may further enhance the dynamics and unexpectedness of automatically edited video content by easily creating a second shuffled video content using original video content in response to a selection of the user after the automatically edited shuffled video content is created randomly.

A system and method for editing video contents automatically according to example embodiments may motivate a user to muse video content and may further enhance the dynamics and unexpectedness of automatically edited video content by editing shuffled video content as new original video content randomly and automatically in response to a selection of a user after the automatically edited shuffled video content is created randomly.

A system and method for editing video contents automatically according to example embodiments may provide automatically edited video content, which adaptively meets various intents of a user, by adjusting an editing level randomly in response to a selection of a user on, for example, a touch time sensed at a touch sensing module, a touch pressure, or a shake time sensed at a motion sensing module, intensity of shake, etc.

A system and method for editing video contents automatically according to example embodiments may enhance the immersion of a user and may enhance the dynamics of automatically edited video content by removing unnecessarily continuous static scenes automatically and thereby enhancing the video quality of the automatically edited video content.

A system and method for editing video contents automatically according to example embodiments may enhance the immersion of a user and may enhance the dynamics of automatically edited video content by creating shuffled video content to meet a set target run time or a set play time of background music and thereby enhancing the video quality of the automatically edited video content.

A system and method for editing video contents automatically according to example embodiments may enhance the immersion of a user and may enhance the dynamics of automatically edited video content by removing an unnecessary part captured during a camera movement or a camera rotation automatically and thereby enhancing the video quality of the automatically edited video content.

A system and method for editing video contents automatically according to example embodiments may enhance the dynamics and unexpectedness of automatically edited video content by applying a compression and play method, an extended play method, and a reverse play method to an original video sequence or a subset video sequence randomly.

A system and method far editing video contents automatically according to example embodiments may enhance the video quality by automatically cross-editing additional video content captured in the same time as a time in which original video content is captured and by applying a camera transition effect, such as seen in professional video materials, to automatically edited video content.

A system and method far editing video contents automatically according to example embodiments may enhance the video quality of automatically edited video content by automatically inserting another video content, a photo, etc., captured at the same location as a location at which original video content is captured into shuffled video content as an external video sequence.

A system and method for editing video contents automatically according to example embodiments may enhance the video quality of automatically edited video content by applying a transition effect to an edited subset video sequence automatically.

Additional aspects of example embodiments will be set forth in part in the description which follows and, in part, will be apparent from the description, or may be learned by practice of the disclosure.

BRIEF DESCRIPTION OF DRAWINGS

These and/or other aspects, features, and advantages of the invention will become apparent and more readily appreciated from the following description of example embodiments, taken in conjunction with the accompanying drawings of which:

FIG. 1 is a block diagram illustrating a configuration of a system for editing video contents automatically according to an example embodiment.

FIG. 2 illustrates an example of video content showing a process of creating shuffled video content according to another example embodiment.

FIG. 3 illustrates an example of video content showing a process of creating shuffled video content according to another example embodiment.

FIG. 4 illustrates an example of video content showing a process of creating shuffled video content using a plurality of original video contents according to another example embodiment.

FIG. 5 illustrates an example of video content showing a process of creating shuffled video content using additional video content according to another example embodiment.

FIG. 6 is a flowchart illustrating a method of editing video contents automatically according to an example embodiment.

FIG. 7 is a flowchart illustrating a method of removing a static frame based on a setting of a target run time according to another example embodiment.

FIG. 8 is a flowchart illustrating a method of removing a static frame based on a setting of background music according to another example embodiment.

FIG. 9 is a flowchart illustrating a method of creating shuffled video content using additional video content according to another example embodiment.

FIG. 10 is a flowchart illustrating a method of creating shuffled video content using an external video according to another example embodiment.

MODE FOR THE INVENTION

Hereinafter, some example embodiments will be described in detail with reference to the accompanying drawings. Regarding the reference numerals assigned to the elements in the drawings, it should be noted that the same elements will be designated by the same reference numerals, wherever possible, even though they are shown in different drawings. Also, in the description of embodiments, detailed description of well-known related structures or functions will be omitted when it is deemed that such description will cause ambiguous interpretation of the present disclosure.

The terms used herein is for the purpose of describing particular example embodiments only and is not to be used to limit the disclosure. Unless otherwise defined, all terms including technical and scientific terms used herein have the same meaning as commonly understood by one of ordinary skill in the art to which this disclosure pertains. Terms, such as those defined in commonly used dictionaries, are to be interpreted as having a meaning that is consistent with their meaning in the context of the relevant art, and are not to be interpreted as an idealized or overly formal sense unless expressly so defined herein.

Accordingly, configurations illustrated in the example embodiments and drawings are provided as an example only and do not reflect the technical spirit of the disclosure. Accordingly, there may be various equivalents and modifications to replace the configuration at the time of application of this disclosure.

It should be noted that if it is described in the specification that one part includes one component, it indicates that another component may be further included instead of excluding the other component, unless described otherwise. Also, terms "-module", "-er/or", "-system", etc., indicate a unit to process at least one function or operation, and may be configured through hardware or software or combination of hardware and software, and may be included in a single apparatus or each different apparatus.

Hereinafter, a system for editing video contents automatically (hereinafter, automatic video content editing system) 100 will be described with reference to the accompanying drawings. FIG. 1 is a block diagram illustrating a configuration of an automatic video content editing system according to an example embodiment. Referring to FIG. 1, the automatic video content editing system 100 according to an example embodiment may include an input interface module 110, a video sequence setting module 130, a video sequence shuffling module 140, and a shuffled video content storage module 150.

The respective components are functionally classified to explicitly describe an operation of the automatic video content editing system 100 according to an example embodiment. Accordingly, instead of being classified into a physically distinct single component, each module may be configured as a set of computer instructions that constitute a portion of a program and a function of the corresponding module may be expressed by an arithmetic, processing apparatus in response to an execution of the program.

Also, all of the components of the automatic video content editing system 100 according to an example embodiment may be configured in a form of a program/application executed on an information processing terminal, for example, a smartphone or a user computer. A portion of the components may be configured on a client terminal and another portion of the components may be configured in a form of a server client service on a server computer that is connected to a client terminal over a communication network. Components may be distributively configured in each server of a distributive server system. Alternatively, components may be configured as a set of logic circuits that constitute a semiconductor processor.

The input interface module 110 serves to receive an input from a user. The input interface module 110 may be configured as a human interface device to receive various inputs from the user. For example, the input interface module 110 may be a keyboard or a keypad to convert a keystroke of the user to input data, a touch pad or a touch screen to convert whether the user touches a screen, a touch pressure, a touch time, a touch pattern, etc., to input data, a camera to convert a motion of the user to input data, a motion detecting sensor to convert a spatial movement of a terminal to input data, a microphone to convert voice of the user to input data, a mouse to convert a click of the user to input data, and the like.

The input interface module 110 serves to receive a selection on original video content (content_video_original) to be edited from the user, and to receive a video edit activation input (input_activation_edit) for requesting editing of the original video content (content_video_original) from the user.

The video edit activation input (input_activation_edit) may be embodied in such a manner that, for example, the user executes an application in which the automatic video content editing system 100 according to an example embodiment is configured, and the application generates the video edit activation input (input_activation_edit) immediately when the user calls the original video content (content_video_original) to be edited from a storage device through the application or downloads the original video content (content_video_original) through connection to a cloud driver over a communication network.

As another method, the video edit activation input (input_activation_edit) may be embodied in such a manner that the application generates the video edit activation input (input_activation_edit) when the user selects the original video content (content_video_original) through the application and selects an object allocated for a video content edit activation through the input interface module 110.

As another method, the video edit activation input (input_activation_edit) may be embodied in such a manner that a web server generates the video edit activation input (input_activation_edit) immediately when the user connects to a webpage on which the automatic video content editing system 100 according to an example embodiment is configured through a web browser and selects the original video content (content_video_original) provided from the web server through the webpage.

As another method, the video edit activation input (input_activation_edit) may be embodied in such a manner that the web server generates the video edit activation input (input_activation_edit) when the user selects the original video content (content_video_original) through the webpage and selects the object allocated for the video content edit activation through the input interface module 110.

In response to receiving the video edit activation input (input_activation_edit) from the input interface module 110, the video sequence setting module 130 serves to define a set of consecutive frames of an original frame as a single original video sequence (sequence_video_original) and to divide the original video content (content_video_original) into a first original video sequence (sequence_video_original_1st) to an n-th original video sequence (sequence_video_original_nth). Here, n denotes an integer greater than or equal to 2. That is, the video sequence setting module 130 serves to divide the original video content (content_video_original) configured to be continuous into a plurality of original video sequences (sequence_video_original).

Here, the video sequence setting module 130 may divide the original video content (content_video_original) into the original video sequences (sequence_video_original) based on various criteria. The video sequence setting module 130, first, performs division based on captured objects, second, detects a movement or a rotation of a camera and performs division based on the detected movement or rotation, third, performs division at random intervals, and, fourth, performs equal division based on substantially the uniform number of frames. Fifth, the video sequence setting module 130 performs division based on similar frames through a frame analysis.

Initially, according to an example embodiment of performing division based on captured objects, the automatic video content editing system 100 further includes a frame image processing module 120 configured to perform an image analysis for each frame and to detect a captured object that is included in a frame. For example, in an example embodiment of FIG. 2, the frame image processing module 120 recognizes a single person as a captured object with respect to frame 1 to frame 3, recognizes two persons as captured objects with respect to frame 4 to frame 6, and recognizes a single vehicle as a captured object with respect to frame 7 to frame 9. Next, the video sequence setting module 130 is configured to define consecutive frames based on the captured object detected at the frame image processing module 120 as a single original video sequence.

According to the example embodiment, the frame image processing module 120 may divide the original video content (content_video_original) into the original video sequences (sequence_video_original) for each captured object. Accordingly, it is possible to detect a scene automatically and maintain the context of a video to be uniform even after editing of the video content.

Next, according to an example embodiment of detecting a camera movement or rotation and performing division based on the detected camera movement or detection, the automatic video content editing system 100 further includes the frame image processing module 120 configured to detect camera adjustment frames (frame_moving) that are frames captured during the camera movement or frames captured during the camera rotation. The video sequence setting module 130 defines, as a single original video sequence (sequence_video_original), consecutive frames based on the camera adjustment frames (frame_moving) that are detected at the frame image processing module 120.

Here, the frame image processing module 120 may detect the frames captured during the camera movement or the frames captured during the camera rotation by applying a known scheme of detecting motion information from video content, for example, an analysis of difference image, a block matching algorithm, an optical flow analysis, and the like. According to the example embodiment, it is possible to detect a scene transition automatically through detection of the camera adjustment frames and maintain the context of a video to be uniform even after editing of the video content, particularly, in the original video content (content_video_original) in which the scene transition by a camera switching has occurred.

Next, according to an example embodiment of performing division at random intervals, the video sequence setting module 130 defines a set of the random number of consecutive frames as a single original video sequence (sequence_video_original).

According to the example embodiment, each of the original video sequences (sequence_video_original) includes the different number of frames. Thus, the dynamics and unexpectedness of shuffled video content (content_video_shuffled) edited after editing of video content may be enhanced. In addition, a system configuration is simplified since the frame image processing, module 120 is not required separately.

Next, according to an example embodiment of performing equal division based on substantially the uniform number of frames, the video sequence setting module 130 defines that each of the original video sequences (sequence_video_original) includes a set a substantially the same number of consecutive frames.

Here, the frames may not be divided uniformly. Thus, a specific original video sequence (sequence_video_original) may include the greater or less number of frames than other original video sequences (sequence_video_original).

According to the example embodiment, a system configuration is simplified since the frame image processing module 120 is not required separately.

Next, according to an example embodiment of performing division based on similar frames, the automatic video content editing system 100 further includes the frame image processing module 120 configured to analyze each frame of the original video content (content_video_original) in response to receiving the video edit activation input (input_activation_edit) from the input interface module 110, and to calculate a frame correlation (correlation_frame) that is a correlation between consecutive frames. Meanwhile, as a method of calculating the frame correlation (correlation_frame) through video processing, a variety of methods have been developed in the video processing field. For example, there may be a method of comparing strengths of corresponding pixels in consecutive frames and detecting the frame correlation (correlation_frame) based on a variation thereof, a method of dividing a consecutive frame into a plurality of blocks and calculating a correlation between blocks, a method of representing a strength or color of a pixel as a histogram and calculating the frame correlation (correlation_frame) based on a histogram difference, a method of estimating a motion of an object on a consecutive frame through a pixel rotation algorithm or a block matching algorithm, and the like.

The aforementioned example embodiment is provided as an example only and the method of calculating the frame correlation (correlation_frame) is not particularly limited thereto. The frame image processing module 120 may be configured using a method known in the image processing field.

In the example embodiment, the video sequence setting module 130 serves to define a set of consecutive frames having the frame correlation (correlation_frame) greater than or equal to a first setting value as a single original video sequence (sequence_video_original), and to divide the original video content (content_video_original) into the first original video sequence (sequence_video_original_1st) to the n-th original video sequence (sequence_video_original_nth). Here, n denotes an integer greater than or equal to 2. That is, the video sequence setting module 130 recognizes a frame in which a relative change is small as a portion of a single scene, and recognizes a frame in which a relative change is great as a start of a separate scene. A video sequence used herein is a concept similar to a single scene as a set of similar frames. However, a scene used herein is estimated through post video processing of the already captured video content and has a difference with an original meaning of a scene.

The first setting value denotes a lower limit of the frame correlation (correlation_frame). If the frame correlation (correlation_frame) is greater than the first setting value, it indicates that a similarity between consecutive frames is high and thus, the consecutive frames belong to the same sequence. Conversely, if the frame correlation (correlation_frame) is less than the first setting value, it indicates that the similarity between consecutive frames is low and thus, the consecutive frames belong to different sequences, respectively. Also, if the first setting value is low, a probability that the consecutive frames belong to the same sequence increases and it corresponding to the total number of video sequences decreases. On the contrary, if the first setting value is high, the probability that the consecutive frames belong to the same sequence decreases and n corresponding to the total number of video sequences increases.

If the video content is captured from a static subject, such as scenery, the frame correlation (correlation_frame) appears to be statistically high. Conversely, if the video content is captured from a dynamic subject, such as a sports game, the frame correlation (correlation_frame) appears to be statistically low. Thus, depending on example embodiments, the first setting value may be configured to vary adaptively based on a type of the original video content (content_video_original). For example, the frame image processing module 120 may further calculate an average value of the frame correlation (correlation_frame), and the video sequence setting module 130 may increase the total number, n, of video sequences by setting a high first setting value with respect to the original video content (content_video_original) having a high average value of the frame correlation (correlation_frame) and, conversely, may decrease the total number, n, of video sequences by setting a low first setting value with respect to the original video content (content_video_original) having a low average value of the frame correlation (correlation_frame). In this manner, the first setting value may be adaptively adjusted based on an attribute of the original video content (content_video_original).

If a statically captured section and a dynamically captured section coexist in a single piece of original video content (content_video_original), the video sequence setting module 130 may be configured to set a first setting value adjusted to be high in a section corresponding to a high average value of the frame correlation (correlation_frame) and to apply a first setting value adjusted to be low in a section corresponding to a low average value of the frame correlation (correlation_frame).

Meanwhile, instead of selecting a single method from among the aforementioned various methods of dividing the original video sequence (sequence_video_original), a plurality of methods may be used together or randomly selected. For example, when the frame image processing module 120 recognizes two types of captured objects at a first half of 5 minutes and a second half of 5 minutes from the original video content (content_video_original) with the length of 10 minutes, a length of the single original video sequence (sequence_video_original) may be regarded to be significantly long and the frame image processing module 120 may divide again 5 minutes of the first half randomly or equally and divide again 5 minutes of the second half randomly or equally.

As another example, when the frame image processing module 120 recognizes only a single type of a captured object from the original video content (content_video_original) with the length of 10 minutes, the frame image processing module 120 may detect whether a camera adjustment frame (frame_moving) is present if the original video sequence (content_video_original) is not divided into the sufficient number of original video sequences (sequence_video_original) even with the camera adjustment frame (frame_moving), the frame image processing module 120 may divide the original video content (content_video_original) into a plurality of original video sequences (sequence_video_original) through a random division method or an equal segmentation method.

The video sequence shuffling module 140 serves to create shuffled video content (content_video_shuffled) by randomly shuffling a subset video sequence (subset_sequence_video) including at least a portion of a k-th original video sequence (sequence_video_original_kth) to follow after a (k+1)-th original video sequence (sequence_video_original_k+1th) or to precede a (k−1)-th of video sequence (sequence_video_original_k−1th). Here, k denotes an integer greater than or equal to 1 and less than or equal to n−1.

In general video content editing, the user selects frames to be edited and inserts the selected frames into a preceding or following frame or deletes the selected frames from the preceding or following frame. A general user without skilled editing knowledge may use a large amount of time in editing video content. Also, it may be further difficult for the user to precisely select an editing section through a touch interface, such as shown in a smartphone, without using professional editing equipment. In generally, frames are continuously monotonous since video content captured with a single camera is captured in temporal order.

According to an example embodiment, the video sequence shuffling module 140 automatically sets, as an editing section, all of the original video sequences (sequence_video_original) [if the entire original video sequences (sequence_video_original) are set as the subset video sequence (subset_sequence_video)] divided at the video sequence setting module 130 or the subset video sequence (subset_sequence_video) that is a portion of the original video sequences (sequence_video_original) and thus, there is no need to receive a selection on the editing section from the user. Also, the video sequence shuffling module 140 randomly shuffles the original video sequence (sequence_video_original) or the subset video sequence (subset_sequence_video) selected as the editing section as a random frame and thus, there is no need to receive a selection on a point to which the editing section is to move to from the user. Finally, it is possible to acquire the shuffled video content (content_video_shuffled) that includes a relatively frequent scene transition and does not follow a temporal order, that is, to which the unexpectedness is applied, compared to the original video content (content_video_original) captured by the user.

The video sequence shuffling module 140 does not need to select only a single original video sequence from among n original video sequences (sequence_video_original) as the k-th original video sequence (sequence_video_original_kth). That is, it is possible to enhance the unexpectedness and dynamics of the shuffled video content (content_video_shuffled) by selecting and randomly shuffling the plurality of original video sequences (sequence_video_original).

Also, the video sequence shuffling module 140 may select the entire k-th original video sequence (sequence_video_original_kth) as the subset video sequence (subset_sequence_video), and may select only a portion of the k-th original video sequence (sequence_video_original_kth) as the subset video sequence (subset_sequence_video). Accordingly, it is possible to further enhance the unexpectedness and dynamics of the shuffled video content (content_video_shuffled) by selecting a single original video sequence (sequence_video_original) including a set of similar frames as a plurality of subset video sequences (subset_sequence_video).

When the video sequence shuffling module 140 selects a portion of the original video sequence (sequence_video_original) as the subset video sequence (subset_sequence_video), the number of frames to be included in each selected selection may be determined randomly or may be determined as the preset number of frames. Depending on example embodiments, each of the plurality of subset video sequences (subset_sequence_video) that constitute the single original video sequence (sequence_video_original) may include the same number of frames or may include the different number of frames.

The subset video sequence (subset_sequence_video) may be configured to precede or follow after a random original video sequence (sequence_video_original) in response to, for example, an occurrence of random sampling number of an arithmetic processing apparatus. Also, another original video sequence (sequence_video_original) to which the subset video sequence (subset_sequence_video) is to be shuffled may be divided into subset video sequences (subset_sequence_video). Thus, the subset video sequence (subset_sequence_video) to be shuffled may be shuffled to be inserted in the middle of the other original video sequence (sequence_video_original).

Here, a sudden scene transition occurs at a start point and an end point of the shuffled subset video sequence (subset_sequence_video) of the shuffled video content (content_video_shuffled). In this case, the video quality of the shuffled video content (content_video_shuffled) corresponding to a product may be degraded. To outperform the above issue, the automatic video content editing system 100 may further include a transition effect module 149 configured to apply a transition effect to at least one of the start point and the end point of the shuffled subset video sequence (subset_sequence_video). The transition effect is for natural scene transition and may be, for example, a fade-in effect, a fade-out effect, a screen flick animation effect, and the like.

Although it is a principle to shuffle the subset video sequence (subset_sequence_video) randomly, an additional rule may be applied depending on example embodiments. For example, in a situation in which a first subset video sequence (subset_sequence_video) of a third original video sequence (sequence_video_original_3rd) is shuffled randomly and then a second subset video sequence (subset_sequence_video_2nd) of the third original video sequence (sequence_video_original_3rd) is shuffled randomly, the first subset video sequence (subset_sequence_video_1st) and the second subset video sequence (subset_sequence_video_2nd) may happen to couple with each other or to be adjacent to each other at a significantly close distance. In this case, the unexpectedness and dynamics of the shuffled video content (content_video_shuffled) may be degraded. To prevent this degradation, a plurality of subset video sequences (subset_sequence_video) that constitutes the same original video sequence (sequence_video_original) may be arranged randomly. In this instance, for example, a rule that the plurality of subset video sequences need to be separate from each other at the minimum of 300 frames may be applied.

Depending on example embodiments, the video sequence shuffling module 140 may be configured to, for example, constitute one of frames of each video sequence as a thumbnail through a display of a user terminal when shuffling the video sequences and to visually output, for the user, an animation that thumbnails arranged in order of the original video content (content_video_original) are shuffled in order of shuffled video content (content_video_shuffled) randomly combined while the thumbnails is being shaken.

The shuffled video content storage module 150 serves to store sequence arrangement information (info_arrange_sequences) that is information about the shuffled video content (content_video_shuffled) or arrangement order of original video sequences (sequence_video_original) of the shuffled video content (content_video_shuffled) and the subset video sequence (subset_sequence_video). For example, the shuffled video content storage module 150 may encode the shuffled video content (content_video_shuffled) to a single video file and may store the video file at the shuffled video content (content_video_shuffled). The shuffled video content storage module 150 may be a data storage medium to store data to be reusable, such as a hard driver, a flash memory, and a solid state drive (SSD), and may be a buffer memory to temporarily store data, such as random access memory (RAM).

Meanwhile, once the video file of the shuffled video content (content_video_shuffled) is stored, it may be difficult to use the video file in a mobile terminal such as a smartphone, etc., with a limited storage capacity, since, for example, similar video files, the video file of the original video content (content_video_original) and the video file of the shuffled video content (content_video_shuffled), are all stored. As a method of solving the above issue, the original video file may be deleted from the storage device of the mobile terminal or the shuffled video content (content_video_shuffled) may be stored in a web server through a communication network. As another method, the video sequence shuffling module 140 may store, for example, identification information of original video sequences (sequence_video_original) and the subset video sequence (subset_sequence_video), start time information, and end time information and arrangement order of the original video sequences (sequence_video_original) and the subset video sequence (subset_sequence_video) as meta information of the original video content (content_video_original) and may not store the shuffled video content (content_video_shuffled), thereby minimizing the occupancy of the storage space.

In an example embodiment in which the shuffled video content storage module 150 is configured in the user terminal, the shuffled video content (content_video_shuffled) stored in the shuffled video content storage module 150 may be loaded and provided to the user through the user terminal in response to a completion of automatic editing or a play request from the user. In an example embodiment in which the shuffled video content storage module 150 is configured in a server connected to the user terminal through a communication network as a server client system, the shuffled video content (content_video_shuffled) stored in the shuffled video content storage module 150 may be provided to the user terminal using a streaming scheme, a download scheme, and the like, through the communication network in response to a completion of automatic editing or a play request from the user.

In an example embodiment in which the shuffled video content storage module 150 is configured in the user terminal, sequence arrangement information (info_arrange_sequences) stared in the shuffled video content storage module 150 may be loaded in response to a completion of automatic editing or a play request from the user, to provide the shuffled video content (content_video_shuffled) to the user by shuffling original video sequences (sequence_video_original) or subset video sequences (subset_sequence_video) of the original video content (content_video_original) based on the sequence arrangement information (info_arrange_sequences) in real time. In an example embodiment in which the shuffled video content storage module 150 is configured in the server connected to the user terminal through the communication network as the server-client system, sequence arrangement information (info_arrange_sequences) stored in the shuffled video content storage module 150 may be loaded in response to a completion of automatic editing or a play request from the user, to provide shuffled video content (content_video_shuffled) to the user using a streaming scheme or a download scheme through the communication network by shuffling, original video sequences (sequence_video_original) or subset video sequences (subset_sequence_video) of the original video content (content_video_original) based on the sequence arrangement information (info_arrange_sequences) in real time.

Hereinafter, a function of each component will be further described with reference to FIG. 2. FIG. 2 illustrates an example of video content showing an example of creating shuffled video content (content_video_shuffled) according to another example embodiment. Referring to FIG. 2, original video content (content_video_original) includes frame 1 to frame 9. In frame 1 to frame 3, a single person is captured. In frame 4 to frame 6, two persons are captured. In frame 7 to frame 9, a vehicle is captured.

If the user executes an application in which the automatic video content editing system 100 according to an example embodiment is configured, selects the original video content (content_video_original), and inputs a video edit activation input (input_activation_edit) through the input interface module 110, such as a touch screen and the like, the video sequence setting module 130 groups frame 1 to frame 3 into a first original video sequence (sequence_video_original_1st), groups frame 4 to frame 6 into a second original video sequence (sequence_video_original_2nd), and groups frame 7 to frame 9 into a third original video sequence (sequence_video_original_3rd), and classifies consecutive frames, that is, frame 3 and frame 4, and frame 6 and frame 7 as a separate original video sequence (sequence_video_original). Here, as described above, the video sequence setting module 130 may divide the original video sequence (sequence_video_original) based on a captured object, a camera adjustment frame (frame_moving), or a frame correlation (correlation_frame), or based on the random number of frames or the uniform number of frames using the frame image processing module 120.

Next, the video sequence shuffling module 140 shuffles the second original video sequence (sequence_video_original_2nd) to be disposed after the third original video sequence (sequence_video_original_3rd). The video sequence shuffling of the video sequence shuffling module 140 is performed randomly. This case corresponds to a case in which the video sequence shuffling module 140 defines the entire frames of the second original video sequence (sequence_video_original_2nd) as a subset video sequence (subset_sequence_video).

Finally, the shuffled video content storage module 150 stores the sequence arrangement information (info_arrange_sequences) or the shuffled video content (content_video_shuffled) that is shuffled in order of the first original video sequence (sequence_video_original), the third original video sequence (sequence_video_original_3rd), and the second original video sequence (sequence_video_original_2nd).

As shown in FIG. 2, in the shuffled video content (content_video_shuffled), another scene is inserted in the middle of continuous scenes and thus, a dynamically changing video is provided. In addition, the unexpectedness is applied to the content since the shuffled video content (content_video_shuffled) is created without an intentional editing behavior of the user.

FIG. 3 illustrates an example of video content showing an example of creating shuffled video content according to another example embodiment. A frame configuration of the original video content (content_video_original) and a sequence division by the video sequence setting module 130 shown in FIG. 3 are the same as the example embodiment of FIG. 2. Thus, a repeated description is omitted here.

The video sequence shuffling module 140 classifies frame 7 of the third original video sequence (sequence_video_original_3rd) into a first subset video sequence (subset_sequence_video_1st), classifies frame 8 and frame 9 of the third original video sequence (sequence_video_original_3rd) into a second subset video sequence (subset_sequence_video_2nd). The video sequence shuffling module 140 shuffles the first subset video sequence (subset_sequence_video_1st) to precede the first original video sequence (sequence_video_original_1st) and shuffles the second subset video sequence (subset_sequence_video__2nd) to be disposed between the first original video sequence (sequence_video_original_1st) and the second original video sequence (sequence_video_original_2nd). The video sequence shuffling of the video sequence shuffling module 140 is performed randomly.

Finally, the shuffled video content storage module 150 stores the sequence arrangement information (info_arrange_sequences) or the shuffled video content (content_video_shuffled) that is shuffled in order of the first subset video sequence (subset_sequence_video_1st), the first original video sequence (sequence_video_original_1st), the second subset video sequence (subset_sequence_video_2nd), and the second original video sequence (sequence_video_original_2nd).

As shown in FIG. 3, in the shuffled video content (content_video_shuffled), a single original video sequence (sequence_video_original) is divided into a plurality of subset video sequences (subset_sequence_video) and the plurality of subset video sequences (subset_sequence_video) are distributively arranged. Thus, compared to the example embodiment of FIG. 2, the shuffled video content (content_video_shuffled) is changed to a further dynamic video and the unexpectedness of the shuffled video content (content_video_shuffled) is also further enhanced.

Meanwhile, although an example of shuffling video sequences of a single piece of original video content (content_video_original) is described with reference to FIGS. 2 and 3, video sequences of a plurality of original video contents (content_video_original) may be alternately shuffled. In this case, the dynamics and unexpectedness of the shuffled video content (content_video_shuffled) are further enhanced.

To this end, the video sequence setting module 130 divides the plurality of original video contents (content_video_original) into a first original video sequence (sequence_video_original_1st) to an n-th original video sequence (sequence_video_original_nth), and the video sequence shuffling module 140 creates a single piece of shuffled video content (content_video_shuffled). That is, an example embodiment of editing the plurality of original video contents (content_video_original) automatically creates the single piece of shuffled video content. (content_video_shuffled) by dividing the original video sequences (sequence_video_original) for each of the original video contents (content_video_original) and shuffling all of the original video sequences (sequence_video_original) randomly.

Here, if the plurality of original video contents (content_video_original) has different frame aspect ratios, the automatic video content editing system 100 may adjust the frame aspect ratios to be uniform automatically.

FIG. 4 illustrates an example of video content showing an example of creating shuffled video content (content_video_shuffled) using a plurality of original video contents (content_video_original) according to another example embodiment Referring to FIG. 4, first original video content (content_video_original_1st) includes frame 1-1 to frame 1-6, and second original video content (content_video_original_2nd) includes frame 2-1 to frame 2-3. In frame 1-1 to frame 1-3, a single person is captured. In frame 1-4 to frame 1-6, two persons are captured. In frame 2-1 to frame 2-3, a house is captured.

If the user executes an application in which the automatic video content editing system 100 according to an example embodiment is configured, selects the plurality of original video contents (content_video_original), and inputs a video edit activation input (input_activation_edit) through the input interface module 110, such as a touch screen and the like, the video sequence setting module 130 groups frame 1-1 to frame 1-3 into a first original video sequence (sequence_video_original_1st), groups frame 1-4 to frame 1-6 into a second original video sequence (sequence_video_original_2nd), and groups frame 2-1 to frame 2-3 into a third original video sequence (sequence_video_original_3rd), and classifies consecutive frames, that is, frame 1-3 and frame 1-4, and frame 1-6 and frame 2-1 as a separate original video sequence (sequence_video_original). Here, as described above, the video sequence setting module 130 may divide the original video sequence (sequence_video_original) based on a captured object, a camera adjustment frame (frame_moving), or a frame correlation (correlation_frame), or based on the random number of frames or the uniform number of frames using the frame image processing module 120.

In the example embodiment of using the frame correlation (correlation_frame), the frame image processing; module 120) calculate the frame correlation (correlation_frame) between consecutive frames. Here, for example, frame 1-1 and frame 1-2 or frame 2-2 and frame 2-3, are similar frames and thus, have a relatively high frame correlation (correlation_frame). Conversely, a new subject is added to frame 1-4 and frame 2-1 corresponds to different original video content (content_video_original_2nd). Thus, frame 1-3 and frame 1-4, and frame 1-6 and frame 2-1 have a relatively low frame correlation (correlation_frame). Meanwhile, different original video contents (content_video_original) barely have a correlation and do not include consecutive frames. Thus, depending on example embodiments, the frame image processing module 120 may not calculate the frame correlation (correlation_frame) between frame 1-6 and frame 2-1. The video sequence setting module 130 groups consecutive frames having a relatively high frame correlation (correlation_frame) into the same original video sequence (sequence_video_original), and classifies consecutive frames having a relatively low frame correlation (correlation_frame) as different original video sequences (sequence_video_original).

Next, the video sequence shuffling module 140 shuffles the second original video sequence (sequence_video_original_2nd) to be disposed after the third original video sequence (sequence_video_original_3rd). The video sequence shuffling of the video sequence shuffling module 140 is performed randomly. This case corresponds to a case in which the video sequence shuffling module 140 defines the entire frames of the second original video sequence (sequence_video_original_2nd) as a subset video sequence (subset_sequence_video).

Finally, the shuffled video content storage module 150 stores the sequence arrangement information (info_arrange_sequences) or the shuffled video content (content_video_shuffled) that is shuffled in order of the first original video sequence (sequence_video_original_1st), the third original video sequence (sequence_video_original_3rd), and the second original video sequence (sequence_video_original_2nd).

Meanwhile, if the user requests another shuffled video content (content_video_shuffled) after viewing the randomly and automatically edited shuffled video content (content_video_shuffled), automatic editing may be configured to create second shuffled video content (content_video_shuffled_2nd) by, as a first method, shuffling again the original video sequence (sequence_video_original) randomly, or by, as a second method, shuffling again the shuffled video content (content_video_shuffled) randomly.

Initially, an example embodiment of creating the second shuffled video content (content_video_shuffled_2nd) by shuffling again the original video sequence (sequence_video_original) randomly in response to a request from the user after the creation of the shuffled video content (content_video_shuffled) will be described.

To this end, the video sequence shuffling module 140 is configured to create the second shuffled video content (content_video_shuffled_2nd) by shuffling again the original video sequence (sequence_video_original) and or the subset video sequence (subset_sequence_video) in response to receiving an additional shuffle activation input (input_activation_shuffled_renewal) from the input interface module 110 after the citation of the shuffled video content (content_video_shuffled).

For example, using a method in which the user shakes the user terminal while or after playing and verifying the shuffled video content (content_video_shuffled) on the user terminal, or selects an object corresponding to the additional shuffle activation input (input_activation_shuffled_renewal), the automatic video content editing system 100 may create the second shuffled video content (content_video_shuffled_2nd) that is randomly edited to be different from the shuffled video content (content_video_shuffled).

Depending on example embodiments, the video sequence setting module 130 may be configured such that a relatively great change may occur in the second shuffled video content (content_video_shuffled_2nd) compared to the initially shuffled video content (content_video_shuffled). In the example embodiment of using the frame correlation (correlation_frame), a relatively great change may occur in the second shuffled video content (content_video_shuffled_2nd) using a method of increasing a first setting value.

Next, an example embodiment of creating another shuffled video content (content_video_shuffled) by editing the shuffled video content (content_video_shuffled) automatically in response to a request from the user after the creation of the shuffled video content (content_video_shuffled) will be described.

To this end, in response to receiving an additional video edit activation input (input_activation_iteration) from the input interface module 110 after the creation of the shuffled video content (content_video_shuffled), the video sequence setting module 130, the video sequence shuffling module 140, and the shuffled video content storage module 150 may perform the aforementioned functions alike by using the shuffled video content (content_video_shuffled) as new original video content (content_video_original) and may acquire doubly automatically edited second shuffled video content (content_video_shuffled_2nd).

Meanwhile, the number of frames that constitute the original video sequence (sequence_video_original) may be configured to vary based on a selection of the user. According to the example embodiment, the original video sequence (sequence_video_original) may be divided to include the relatively small number of frames for a user that desires dynamic shuffled video content (content_video_shuffled). Also, the original video sequence (content_video_original) may be divided to include the relatively large number of frames for a user that desires to maintain the context of the original video content (content_video_original).

For example, the example embodiment of using the frame correlation (correlation_frame) may be configured to decrease a first setting value if the user desires only a small change in the original video content (content_video_original), and to increase the first setting value if the user desires a great change in the original video content (content_video_original).

For example, if the first setting value is increased, the number of frames that constitute the same original video sequence in the original video content (content_video_original) decreases. Thus, the number of original video sequences created further increases. Accordingly, the number of original video sequences shuffled randomly decreases and the dynamics and unexpectedness of the shuffled video content (content_video_shuffled) further increases.

Conversely, if the first setting value is decreased, the number of frames that are classified in the same video sequence frame in the original video content (content_video_original) increases and the video sequence frames are classified to be further coarse. Accordingly, the number of video sequence frames shuffled randomly decreases and the dynamics and unexpectedness of the shuffled video content (content_video_shuffled) further decreases.

To this end, the input interface module 110 includes a touch sensing module configured to recognize a touch of the user on a display as the video edit activation input (input_activation_edit). Here, the touch sensing module may distinguishably recognize a touch input time and/or a touch input pressure of the user.

The video sequence setting module 130 is configured to change the number of frames to be included in the set of consecutive frames according to an increase or a decrease in a touch time of the user or an increase or a decrease in a touch pressure of the user.

According to the example embodiment, if the user selects the original video content (content_video_original), and, for example, increases an amount of time used to touch an object corresponding to the video edit activation input (input_activation_edit) on a touch screen, the video sequence setting module 130 may increase or decrease a variation of the shuffled video content (content_video_shuffled). Alternatively, if the user increases a pressure applied to touch the object corresponding to the video edit activation input (input_activation_edit) on the touch screen that identifies a touch pressure, the video sequence setting module 130 may increase or decrease the variation of the shuffled video content (content_video_shuffled).

According to another example embodiment, the input interface module 110 includes a motion sensing module configured to detect a shake of a device and to recognize the detected shake as the video edit activation input (input_activation_edit), and the video sequence shuffling module 140 is configured to change the number of frames to be included in the set of consecutive frames according to an increase or a decrease in a shake time of the device or an increase or a decrease in a shake intensity.

According to the example embodiment, if the user selects the original video sequence (sequence_video_original), and, for example, increases an amount of time used to shake the smartphone including the motion sensing module, the video sequence setting module 130 may increase or decrease the variation of the shuffled video content (content_video_shuffled). Alternatively, if the user increases an intensity applied to shake the smartphone including the motion sensing module, the video sequence setting module 130 may increase or decrease the variation of the shuffled video content (content_video_shuffled).

Meanwhile, video content created by a general user may include a plurality of factors, for example, an unnecessarily continuing static scene, a shake of a screen, a movement and a rotation of a camera triggering defocusing, and the like, which decreases a value of the video content and causes a person viewing the video content to feel bored. According to the example embodiment, it is possible to automatically remove the entire original video sequence (sequence_video_original) including only a static scene, static frames included in the original video sequence (sequence_video_original), or frames generated due to a camera movement or rotation.

To automatically remove the entire original video sequence (sequence_video_original) including only the static scene, the automatic video content editing system 100 may further include a video sequence removing module 142 configured to remove at least one of original video sequences (sequence_video_original) having a sequence correlation (correlation_sequence) greater than or equal to a second setting value. Here, the sequence correlation (correlation_sequence) is a correlation between continuous original video sequences (sequence_video_original).

Dissimilar to the frame correlation (correlation_frame) for calculating the correlation between continuous frames, the sequence correlation (correlation_sequence) is a correlation for calculating a correlation between consecutive sequences and may be configured as, for example, a correlation using statistical image characteristic values of all of the frames that constitute the original video sequence (sequence_video_original), a correlation using an image characteristic value between a final frame of a preceding original video sequence (sequence_video_original) and a first frame of an original video sequence (sequence_video_original) following thereafter, or a combination thereof.

According to the example embodiment, it is possible to enhance the immersion of the user into the shuffled video content (content_video_shuffled) by reducing the entire run time of the shuffled video content (content_video_shuffled) and removing an unnecessarily continuing static section.

To automatically remove a portion of frames (some of frames) of the original video sequence (sequence_video_original) including only a static scene, the automatic video content editing system 100 may further include a video frame removing module 132 configured to remove frames having a frame correlation (correlation_frame) greater than or equal to a third setting value from a k-th original video sequence (sequence_video_original_kth) or the subset video sequence (subset_sequence_video). Here, the third setting value is greater than the first setting value.

For example, if frames set to the same original video sequence (sequence_video_original) have the first setting value of 0.8 that is a lower limit of the frame correlation (correlation_frame) of a sequence setting, the third setting value that is a lower limit of the frame correlation (correlation_frame) of a setting of static frames in the corresponding original video sequence (sequence_video_original) may be 0.97. That is, the third setting value that is the lower limit of static frames needs to be set to be greater than the lower limit of the same sequence setting. Here, a frame correlation (correlation_frame) between adjacent frames is significantly high due to an attribute of video content. Thus, a static section may be discovered using, for example, a method of calculating the frame correlation (correlation_frame) in a specific section, for example, between a first frame and each of the following 49 frames among a minimum of 50 frames, instead of calculating the frame correlation (correlation_frame) only between adjacent frames.

According to the example embodiment, it is possible to enhance the immersion of the user into the shuffled video content (content_video_shuffled) by removing the unnecessarily continuing section.

In general, an edited video may have a run time less than that of an original video since unnecessary and repetitive parts are removed. Here, the unnecessary part may be removed to adjust a run time of the shuffled video content (content_video_shuffled) to meet a setting time set by the user, for example, 1 minute and 30 seconds or to meet a play time of background music desired to insert into the shuffled video content (content_video_shuffled).

To create the shuffled video content (content_video_shuffled) having a run time that meets the setting time of the user, the automatic video content editing system 100 may include a run time setting module 134 configured to set a target run time of the shuffled video content (content_video_shuffled), the frame image processing module 120 configured to analyze each frame of the original video content (content_video_original) in response to receiving the video edit activation input (input_activation_edit) from the input interface module 110 and to calculate a frame correlation (correlation_frame) that is a correlation between consecutive frames, and the video frame removing module 132 configured to remove frames having the frame correlation greater than or equal to the third setting value from the k-th original video sequence (sequence_video_original_kth) or the subset video sequence (subset_sequence_video) to meet the target run time.

To create the shuffled video content (content_video_shuffled) that meets the play time of background music, the automatic video content editing system 100 may include a background music setting module 136 configured to set background music to be included in an audio track, the frame image processing module 120 configured to analyze each frame of the original video content (content_video_original) in response to receiving the video edit activation input (input_activation_edit) from the input interface module 110 and to calculate a frame correlation (correlation_frame) that is a correlation between consecutive frames, and the video frame removing module 132 configured to remove francs having the frame correlation greater than or equal the third setting value from the k-th original video sequence (sequence_video_original_kth) or the subset video sequence (subset_sequence_video) to meet the play time of background music.

The video frame removing module 132 removes a frame in which a change is relatively small and maintains a frame in which the change is relatively great. The third setting value is a lower limit of the frame correlation (correlation_frame) of the frame to be removed. If the frame correlation (correlation_frame) is greater than the third setting, value, the video frame removing module 132 determines that a similarity between consecutive frames is relatively high and removes the corresponding frames. Conversely, if the frame correlation (correlation_frame) is less than the third setting value, the video frame removing module 132 determines that the similarity between consecutive frames is relatively low and maintains the corresponding frames.

If the video content is captured from a static subject, such as scenery, the frame correlation (correlation_frame) appears to be statistically high. Conversely, if the video content is captured from a dynamic subject, such as a sports game, the frame correlation (correlation_frame) appears to be statistically low. Thus, depending on example embodiments, the third setting value may be configured to vary adaptively based on a type of the original video content (content_video_original). For example, the frame image processing module 120 may further calculate an average value of the frame correlation (correlation_frame), and the video sequence setting module 130 may set a high third setting value with respect to the original video content (content_video_original) having an high average value of the frame correlation (correlation_frame) and, conversely, set a low third setting value with respect to the original video content (content_video_original) having a low average value of the frame correlation (correlation_frame). In this manner, the third setting value may be adaptively adjusted based on an attribute of the original video content (content_video_original).

If a statically captured section and a dynamically captured section coexist in a single piece of original video content (content_video_original), the video frame removing module 132 may be configured to set a third setting value adjusted to be high in a section corresponding to a high average value of the frame correlation (correlation_frame) and to apply a third setting value adjusted to be low in a section corresponding to a low average value of the frame correlation (correlation_frame).

To automatically remove frames captured during a camera movement or a camera rotation, the automatic video content editing system 100 may further include the video frame removing module 132 configured to remove, from the k-th original video sequence (sequence_video_original_kth) or the subset video sequence (subset_sequence_video), a camera adjustment frame (frame_moving) that is a video frame captured during the camera movement or a frame captured during the camera rotation as an operation result of the frame image processing module 120.

Here, the frame image processing module 120 may detect frames captured during the camera movement or frames captured during the camera rotation by applying a known scheme of detecting motion information from the video content, far example, an analysis of difference image, a block matching algorithm, an optical flow analysis, and the like.

According to the example embodiments, it is possible to enhance the immersion of the user into the shuffled video content (content_video_shuffled) by reducing the entire run time of the shuffled video content (content_video_shuffled) and removing an unnecessary camera adjustment section.

Meanwhile, it is possible to enhance the dynamics and unexpectedness of content by performing a fast play, a slow play, or a reverse play on some sections of the shuffled video content (content_video_shuffled). To this end, the automatic video content editing system 100 may further include a play mode changing module 148 configured to randomly apply at least one of a compression and play method, an extension and play method, or a reverse play method to at least one of the original video sequences (sequence_video_original) or the subset video sequence (subset_sequence_video).

In the case of capturing the same scene using a plurality of cameras and cross-editing the same, the captured scene is recognized as a high quality video such as movie or a TV drama. With the spread of a smartphone having a video capturing function, a plurality of users may take a video of the same subject at different angles and angles of views in the same place, for example, a concert hall. Here, if synchronizing and combining the respective video contents, it is possible to provide the same effect as if multiple-camera editing is performed. According to an example embodiment, it is possible to enhance the video quality of the shuffled video content (content_video_shuffled) by cross-editing the plurality of original video contents (content_video_original) automatically.

To this end, the automatic video content editing system 100 may further include an additional video sequence extracting module 122 configured to load additional video content (content_video_additional) captured from another camera device in a time substantially the same as a time in which the original video content (content_video_original) is captured and to extract at least a portion of additional video sequences (sequence_video_additional) of the additional video content (content_video_additional), and an additional video sequence inserting module 144 configured to replace the additional video sequence (sequence_video_additional) with at least one of the original video sequences (sequence_video_original) that precede or follow after the time in which the additional video sequence (sequence_video_additional) is captured, or to replace the additional video sequence (sequence_video_additional) with a portion of frames of an original video sequence (sequence_video_original) that precedes or follows after to be adjacent to the time in which the additional video sequence (sequence_video_additional) is captured.

In the example embodiment, the number of pieces of additional video contents (content_video_additional) is not particularly limited and may include a single piece of additional video content (content_video_additional) or a plurality of additional video contents (content_video_additional). Also, the number of additional video sequences (sequence_video_additional) extracted from the single piece of additional video content (content_video_additional) is not particularly limited. A single additional video sequence (sequence_video_additional) may be extracted or a plurality of additional video sequences (sequence_video_additional) may be extracted. A start point and an end point of the extracted video sequence may be selected randomly or may be extracted automatically based on a preset rule. For example, the frame image processing module 120 may detect frames that include a person, a place, a building, etc., classifiable as primary objects through image processing of original video image content, and may extract a section from 50% to 100% of the frames that include the primary objects as additional video content (content_video_additional) of synchronized additional video content (content_video_additional).

Here, the section into which the additional video sequence (sequence_video_additional) is inserted may appear to have a continuity with the original video content (content_video_original). Accordingly, the video sequence shuffling module 140 may not perform shuffling on an area corresponding to a predetermined range in the section into which the additional video sequence (sequence_video_additional) is inserted.

In the example embodiment, synchronization between the original video content (content_video_original) and the additional video content (content_video_additional) is required. To this end, the additional video sequence inserting module 144 may be configured to replace the additional video sequence (sequence_video_additional) by comparing a first audio signal included in the original video sequence (sequence_video_original) to a second audio signal included in the additional video sequence (sequence_video_additional). Alternatively, the additional video sequence inserting module 144 may be configured to replace the additional video sequence (sequence_video_additional) by comparing first capturing time information included in the original video sequence (sequence_video_original) to second capturing time information included in the additional video sequence (sequence_video_additional).

Depending on example embodiments, the additional video sequence inserting module 144 may insert the additional video sequence (sequence_video_additional) before or after setting of the original video sequence (sequence_video_original) by the video sequence setting module 130, or before or after shuffling of the subset video sequence (subset_sequence_video) by the video sequence shuffling module 140.

If the original video content (content_video_original) and the additional video content (content_video_additional) have different frame aspect ratios, the automatic video content editing system 100 may adjust the different frame aspect ratios to be uniform automatically.

Hereinafter, an example embodiment of inserting the additional video sequence (sequence_video_additional) will be described with reference to FIG. 5. FIG. 5 illustrates an example of video content showing an example of creating shuffled video content using additional video content according to another example embodiment. Referring to FIG. 5, the user initially executes an application in which the automatic video content editing system 100 is configured. The user selects two videos captured at similar places in similar time as original video content (content_video_original) and additional video content (content_video_additional), respectively. Here, depending on example embodiments, the automatic video content editing system 100 may be configured to search for video content captured in a similar time and a similar place automatically by referring to capturing time information included in metadata of the original video content (content_video_original), capturing region information, such as GPS information, and etc., through a storage device or web browsing of the user terminal, and to select the retrieved video content as the additional video content (content_video_additional).

In FIG. 5, the original video content (content_video_original) was captured at a far distance to include two persons in a frame, and the additional video content (content_video_additional) was captured at a close distance to include only a single person in a frame. The video sequence setting module 130 sets frame 1-1 to frame 1-5 as a first original video sequence (sequence_video_original_1st). The additional video sequence extracting module 122 extracts frame 2-3 and frame 2-4 of the additional video content (content_video_additional) corresponding to a time in which frame 1-3 and frame 1-4 of the original video content (content_video_original) were captured as the additional video sequence (sequence_video_additional).

The additional video sequence inserting module 144 replaces frames, that is, frame 1-3 and frame 1-4, of the original video sequence (sequence_video_original) corresponding to a synchronized point with the extracted frames, that is, frame 2-3 and frame 2-4, of the additional video sequence (sequence_video_additional). The shuffled video content (content_video_shuffled) is configured in order of frame 1-1, frame 1-2, frame 2-3, frame 2-4, and frame 1-5. Through this, the automatic video content editing system 100 may automatically edit the original video content (content_video_original) in a simple configuration in which two persons are captured to the shuffled video content (content_video_shuffled) changing from a configuration in which two persons are captured to as video in which one person is closed up and then to a configuration in which the two persons are captured using the additional video content (content_video_additional).

In the case of video content captured in a region recognizable, as a famous place, such as the Eiffel Tower and the Statute of Liberty, the video quality of the video content may be enhanced by adding a video or a photo of the corresponding place captured by a professional photographer. For example, video content captured by a photographer who is a general user in front of the Eiffel Tower may contain only a limited scene in a frame due to some constraints in a capturing place. Here, if video content or a photo of the Eiffel tower aerially taken by the professional photographer is added to the corresponding video content, the video quality is improved.

To this end, the automatic video content editing system 100 may further include an external video input module 124 configured to receive an external video sequence (sequence_video_external) corresponding to a location at which the original video content (content_video_original) is captured and an external video inserting module 146 configured to insert the external video sequence (sequence_video_external) into the shuffled video content (content_video_shuffled). The external video input module 124 may receive a photo or video content selected by the user as the external video sequence (sequence_video_external), and may search for video content associated with the corresponding place through a communication network based on capturing location information that is verified from meta information of the original video content (content_video_original) and may input the retrieved video content as the external video sequence (sequence_video_external) automatically.

Hereinafter, a method of editing video contents automatically according to example embodiments will be described with reference to FIGS. 6 through 10.

FIG. 6 is a flowchart illustrating a method of editing video contents automatically according to an example embodiment. Referring to FIG. 6, the automatic video content editing system 100 performs first step s10 of receiving a video edit activation input (input_activation_edit) from a user and loading original video content (content_video_original). In an example embodiment that is configured in a single information terminal, this operation may be performed in such a manner that the user executes an automatic editing application an the information terminal, selects the original video content (content_video_original) that is a target to be edited automatically from a storage device of the information terminal through the automatic editing application, and selects an "automatic edit" menu. In an example embodiment that is configured in a server-client system, the operation may be performed in such a manner that the user connects to an automatic editing service website through a web browser of the information terminal, selects the original video content (content_video_original) and then selects the "automatic edit" menu.

Next, the automatic video content editing system 100 performs second step s20 of defining a set of consecutive frames as a single original video sequence (sequence_video_original) and dividing the original video content (content_video_original) into a first original video sequence (sequence_video_original_1st) to an n-th original video sequence (sequence_video_original_nth). Here, n denotes an integer greater than or equal to 2.

Here, the automatic video content editing system 100 may divide the original video content (content_video_original) into the original video sequences (sequence_video_original) based on various criteria. The automatic video content editing system 100, first, performs division based on captured objects, second, detects a movement or a rotation of a camera and performs division based on the detected movement or rotation, third, performs division at random intervals, and fourth, performs equal division based on substantially the uniform number of frames. Fifth, the automatic video content editing system 100 detects a frame correlation (correlation_frame) and performs division based thereon.

Initially, according to an example embodiment of performing division based on captured objects, in second step s20, the automatic video content editing system 100 performs first sub-step s21 of performing an image analysis for each frame and detecting a captured object that is included in a frame. Next, the automatic video content editing system 100 performs second sub-step s22 of defining consecutive frames based on the captured object that is detected in first sub-step s21 as a single original video sequence (sequence_video_original).

According to the example embodiment, the automatic video content editing system 100 may divide the original video content (content_video_original) into the original video sequences (sequence_video_original) for each captured object. Accordingly, it is possible to detect a scene automatically and maintaining the context of a video to be uniform even after editing of the video content.

Next, according to an example embodiment of detecting a camera movement or rotation and performing division based on the detected camera movement or rotation, in second step s20, the automatic video content editing system 100 performs third sub-step s23 of detecting camera adjustment frames (frame_moving) that are frames captured during the camera movement or frames captured during the camera rotation. Next, the automatic video content editing system 100 performs fourth sub-step s24 of defining consecutive frames based on the camera adjustment frames (frame_moving) that are detected in third sub-step s23 as the single original video sequence (sequence_video_original).

Here, the frame image processing module 120 may detect frames captured during the camera movement or frames captured during the camera rotation by applying a known method of detecting motion information from the video content, for example, an analysis of difference image, a block matching algorithm, an optical flow analysis, and the like.

According to the example embodiment, it is possible to detect a scene transition automatically through detection of the camera adjustment frames and maintain the context of a video to be uniform even after editing of the video content, particularly, in the original video content (content_video_original) in which the scene transition by a camera switching has occurred.

Next, according to an example embodiment of performing division at random intervals, second step s20 is configured such that the automatic video content editing system 100 defines a set of the random number of consecutive frames as the single original video sequence (content_video_original) (s25).

According to the example embodiment, each of the original video sequences (sequence_video_original) includes the different number of frames. Thus, the dynamics and unexpectedness of shuffled video content (content_video_shuffled) edited after editing of video content may be enhanced. In addition, a system configuration is simplified since the frame image processing module 120 is not required separately.

Next, according to an example embodiment of performing equal division based on substantially the uniform number of frames, second step s20 is configured such that the automatic video content editing system 100 defines that each of the original video sequences (sequence_video_original) includes a set of substantially the same number of consecutive frames (s26).

Here, the frames may not be divided uniformly. Thus, a specific original video sequence (sequence_video_original) may include the greater or less number of frames that other original video sequences (sequence_video_original).

According to the example embodiment, a system configuration is simplified since the frame image processing module 120 is not required separately.

Next, according to an example embodiment of detecting the frame correlation (correlation_frame), in second step s20, the automatic video content editing system 100 performs fifth sub-steps of analyzing each frame of the original video content (content_video_original), and calculating the frame correlation (correlation_frame) that is the correlation between consecutive frames. Next, the automatic video content editing system 100 further performs a sixth sub-step of defining a set of consecutive frames having the frame correlation (correlation_frame) greater than or equal to a first setting value as a single original video sequence (sequence_video_original).

According to the example embodiment, the automatic video content editing system 100 may divide the original video content (content_video_original) into the original video sequences (sequence_video_original) based on similar frames of the original video content (content_video_original). Accordingly, it is possible to detect a scene automatically and maintain the context of a video to be uniform even after editing of the video content.

Meanwhile, instead of selecting a single method from among the aforementioned various methods of dividing the original video sequence (sequence_video_original), a plurality of methods may be used together or randomly selected.

Next, the automatic video content editing system 100 performs third step s30 of shuffling a subset video sequence (subset_sequence_video) including at least a portion of a k-th original video sequence (sequence_video_original_kth) to follow after a (k+1)-th original video sequence (sequence_video_original_k+1th) or to precede a (k−1)-th original video sequence (sequence_video_original_k−1th), and creating sequence arrangement information (info_arrange_sequences) that is information about arrangement order of the original video sequences (sequence_video_original) and/or the subset video sequence (subset_sequence_video).

The number of frames of the subset video sequence (subset_sequence_video) is set to be less than or equal to the number of frames of the original video sequence (sequence_video_original). The number of frames of the subset video sequence (subset_sequence_video) may be determined randomly by the automatic video content editing system 100.

A single subset video sequence (subset_sequence_video) may be selected from a single original video sequence (sequence_video_original). Also, a plurality of subset video sequences (subset_sequence_video) may be selected from the single original video sequence (sequence_video_original). The number of subset video sequences (subset_sequence_video) to be selected may be determined randomly by the automatic video content editing system 100.

The automatic video content editing system 100 may apply shuffling only to the single original video sequence (sequence_video_original) and may also apply shuffling to a plurality of original video sequences (sequence_video_original). The number of original video sequences (sequence_video_original) to be shuffled may be determined randomly by the automatic video content editing system 100.

A shuffling location of the subset video sequence (subset_sequence_video) is determined randomly by the automatic video content editing system 100. However, an additional rule may be applied to enhance the unexpectedness and dynamics of the shuffled video content (content_video_shuffled) to be created. For example, a rule that the plurality of subset video sequences (subset_sequence_video) selected from the single original video sequence (sequence_video_original) need to be separate from each other at the minimum of 300 frames may be applied.

Meanwhile, a transition effect, such as a fade-in effect, a fade-out effect, a screen flick animation effect, and the like, may be applied automatically so that the shuffled subset video sequence (subset_sequence_video) may be smoothly connected to the original video sequences (sequence_video_original). To this end, third step s30 may be configured such that the automatic video content editing system 100 applies the transition effect to at least one of the start point or the end point of the shuffled subset video sequence (subset_sequence_video).

The sequence arrangement information (info_arrange_sequences) may include, for example, identification information of original video sequences (sequence_video_original) and the subset video sequence (subset_sequence_video), start time information, end time information, and arrangement order of video sequences and the subset video sequence (subset_sequence_video).

Finally, the automatic video content editing system 100 performs fourth step s40 of storing the shuffled video content (content_video_shuffled) or the sequence arrangement information (info_arrange_sequences) corresponding to the sequence arrangement information (info_arrange_sequences).

In the case of storing only the sequence arrangement information (info_arrange_sequences) rather than storing the shuffled video content (content_video_shuffled), it is possible to minimize the occupancy of the storage space.

In the case of cross-shuffling the video sequences using the plurality of original video contents (content_video_original) rather than using the single piece of original video content (content_video_original), it is possible to further enhance the unexpectedness and dynamics of the shuffled video content (content_video_shuffled). To this end, in first step s10, the automatic video content editing system 100 loads the plurality of original video contents (content_video_ original). In second step s20, the automatic video content editing system 100 divides the plurality of original video contents (content_video_original) into a first original video sequence (sequence_video_original_1st) to an n-th original video sequence (sequence_video_original_nth). In third step s30, the automatic video content editing system 100 creates the single piece of shuffled video content (content_video_ shuffled).

Meanwhile, if the user requests differently re-edited shuffled video content (content_video_shuffled) after viewing randomly and automatically edited shuffled video content (content_video_shuffled), the automatic video content editing system 100 may be configured to create second shuffled video content (content_video_shuffled_2nd) by, as a first method, re-editing the original video sequence (sequence_video_original) randomly, or by, as a second method, re-editing the shuffled video content (content_video_shuffled) randomly and automatically.

To re-edit the original video content (content_video_original) randomly and automatically, the automatic video content editing system 100 performs a fifth step of creating second shuffled video content (content_video_shuffled_2nd) by randomly shuffling the subset video sequence (subset_sequence_video) in response to receiving an additional shuffle activation input (input_activation_shuffled_renewal) from the user (s50) after the fourth step s40.

To re-edit the shuffled video content (content_video_shuffled) randomly and automatically, the automatic video content editing system 100 performs a sixth step of performing second step s20 to fourth step s40 on the shuffled video content (content_video_shuffled) by receiving an additional video edit activation input (input_activation_edit_iteration) from the user (s61) and loading the shuffled video content (content_video_shuffled) as new original video content (content_video_original) (s62).

Meanwhile, the number of original video sequences (sequence_video_original) to be edited randomly automatically in a random manner may be adjusted based on a selection of the user. A relatively small change or a relatively great change may be applied to the original video content (content_video_original) based on the selection of the user.

In an example embodiment of increasing or decreasing a variation according to an increase or a decrease in a touch time of the user on a touch screen or an increase or a decrease in a touch pressure of the user, first step s10 is configured such that the automatic video content editing system 100 receives the touch of the user on a display as the video edit activation input (input_activation_edit), and second step s20 is configured such that the automatic video content editing system 100 changes the number of frames to be included in the set of consecutive frames according to the increase or the decrease in the touch time of the user or the touch pressure of the user.

In an example embodiment of increasing, or decrease a variation according to an increase or a decrease in a shake time of a device or an increase or a decrease in a shake intensity, first step s10 is configured such that the automatic video content editing system 100 receives a shake of the device as the video edit activation input (input_activation_edit), and second step s20 is configured such that the automatic video content editing system 100 changes the number of frames to be included in the set of consecutive frames according to the increase or the decrease in the shake time of the device or the shake intensity.

Meanwhile, unlike the user's intention, the shuffled video content (content_video_shuffled) may be too long or too short. Accordingly, a target run time of the shuffled video content (content_video_shuffled) may be set or the shuffled video content (content_video_shuffled) may be created automatically to meet a play time of background music.

FIG. 7 is a flowchart illustrating a method of removing a static frame based on a setting of a target run time according to another example embodiment. To create the shuffled video content (content_video_shuffled) with the play length consistent with the target run time, referring to FIG. 7, the automatic video content editing system 100 performs seventh step s110 of setting the target run time of the shuffled video content (content_video_shuffled) after first step s10. Next, the automatic video content editing system 100 performs eighth step s112 of analyzing each frame of the original video content (content_video_original) in response to receiving the video edit activation input (input_activation_edit), and calculating a frame correlation (correlation_frame) that is a correlation between consecutive frames. Next, the automatic video content editing system 100 performs ninth step s113, s114 of removing frames having the frame correlation (correlation_frame) greater than or equal to a third setting value from the k-th original video sequence (sequence_video_original_kth) or the subset video sequence (subset_video_sequence) to meet the target run time.

To meet the target run time, the automatic video content editing system 100 may adjust the run time of the shuffled video content (content_video_shuffled) using a method (s115, s117) of initially setting the third setting value as a relatively high value and then reducing the third setting value gradually.

FIG. 8 is a flowchart illustrating a method of removing a static frame based on a setting of background music according to another example embodiment. To create the shuffled video content (content_video_shuffled) with the play length consistent with a play time of background music, referring to FIG. 8, the automatic video content editing system 100 performs tenth step s111 of setting background music to be included in an audio track of the shuffled video content (content_video_shuffled) after first step s10. The automatic video content editing system 100 performs eighth step s112 of analyzing each frame of the original video content (content_video_original) in response to receiving the video edit activation input (input_activation_edit), and calculating a frame correlation (correlation_frame) that is a correlation between consecutive frames. Next, the automatic video content editing system 100 performs ninth step s113, s114 of removing frames having the frame correlation greater than or equal to a third setting value from the k-th original video sequence (sequence_video_original_kth) or the subset video sequence (subset_video_sequence) to meet the play time of background music.

To meet the play time of background music, the automatic video content editing system 100 may adjust the run time of the shuffled video content (content_video_shuffled) using a method (s116, s117) of initially setting the third setting value as a relatively high value and then reducing, the third setting value gradually.

Meanwhile, a screen shake, defocusing, and the like, may occur in a video captured during a camera movement or a camera rotation, which degrades the video quality of video content. Thus, a corresponding part may be removed from the video content automatically.

It is possible to enhance the dynamics and unexpectedness of content by performing a fast play, a slow play, or a reverse play on some sections of the shuffled video content (content_video_shuffled). To this end, third step s30 may be configured such that the automatic video content editing system 100 randomly applies at least one of a compression and play method, an extension and play method, or a reverse play method to at least one of the original video sequences (sequence_video_original) or the subset video sequence (subset_sequence_video).

FIG. 9 is a flowchart illustrating a method of creating shuffled video content (content_video_shuffled) using additional video content additional video content (content_video_additional) according to another example embodiment.

Referring to FIG. 9, the video quality may be enhanced by cross-editing a plurality of video contents captured from the same scene. To this end, the automatic video content editing system 100 performs thirteenth step s130 of loading additional video content (content_video_additional) captured at another camera device in a time substantially the same as a time in which the original video content (content_video_original) is captured after first step s10. Second step s20 and thirteenth step s130 may be performed substantially simultaneously. The automatic video content editing system 100 performs fourteenth step s140 of extracting at least a portion of additional video sequences (sequence_video_additional) of the additional video content (content_video_additional). The automatic video content editing system 100 further performs fifteenth step s150 of replacing the additional video sequence (sequence_video_additional) with at least one of the original video sequence (sequence_video_original) that precede or follow after the time in which the additional video sequence is captured, or replacing the additional video sequence (sequence_video_additional) with a portion of frames of the original video sequence (sequence_video_original) that precedes or follows after to be adjacent to the time in which the additional video sequence (sequence_video_additional) is captured.

Here, a section into which the additional video sequence (sequence_video_additional) is inserted may appear to have a continuity with the original video content (content_video_original). Accordingly, the automatic video content editing system 100 may not perform shuffling on an area corresponding to a predetermined range in the section into which the additional video sequence (sequence_video_additional) is inserted.

In the example embodiment, synchronization between the original video content (content_video_original) and the additional video content (content_video_additional) is required. To this end, fifteenth step s150 is configured such that the automatic video content editing system 100 replaces the additional video sequence (sequence_video_additional) by comparing a first audio signal included in the original video sequence (sequence_video_original) to a second audio signal included in the additional video sequence (sequence_video_additional), or replaces the additional video sequence (sequence_video_additional by comparing first capturing time information included in the original video sequence (sequence_video_original) to second capturing time information included in the additional video sequence (sequence_video_additional).

If the original video content (content_video_original) and the additional video content (content_video_additional) have different frame aspect ratios, the automatic video content editing system 100 may adjust the different frame aspect ratios to be uniform automatically.

FIG. 10 is a flowchart illustrating a method of creating shuffled video content (content_video_shuffled) by adding an external video to original video content (content_video_original) according to another example embodiment. The video quality of the shuffled video content (content_video_shuffled) may be enhanced by further adding external video content captured by a photographer to the original video content (content_video_original) captured by a user. To this end, referring to FIG. 10, the automatic video content editing system 100 performs sixteenth step s160 of loading an external video sequence (sequence_video_external) corresponding to a location at which the original video content (content_video_original) is captured after first step s10. Here, the automatic video content editing system 100 may receive a photo or video content selected by the user as the external video sequence (sequence_video_external). Also, the automatic video content editing system 100 may search for video content associated with a corresponding place through a communication network based on capturing location information that is verified from meta information of the original video content (content_video_original) and may input the retrieved video content as the external video sequence (sequence_video_external) automatically.

The automatic video content editing system 100 performs seventeenth step s170 of inserting the external video sequence (sequence_video_external) into the shuffled video content (content_video_shuffled) and thereby creates the shuffled video content (content_video_shuffled) into which the external video sequence (sequence_video_external) is inserted.

A number of example embodiments have been described above. Nevertheless, it should be understood that various modifications may be made to these example embodiments. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

The invention claimed is:

1. A system for editing video contents automatically, the system comprising:
    an input interface module configured to receive a user input, wherein the input interface module comprises at least one of a touch sensing module configured to recognize a touch of a user on a display as a video edit activation input and a motion sensing module configured to detect a shake of a device and to recognize the detected shake as a video edit activation input;
    a frame image processing module configured to analyze each frame of the original video content in response to receiving the video edit activation input from the input interface module, and to calculate a frame correlation that is a correlation between consecutive frames;
    a video sequence setting module configured to define a set of consecutive frames of original video content as a single original video sequence in response to receiving a video edit activation input from the input interface module, and to divide the original video content into a first original video sequence to an n-th original video sequence, n denoting an integer greater than or equal to 2,
    wherein the video sequence setting module is configured to use one or a combination of a third sequence setting method of defining, as the single original video sequence, a set of the random number of consecutive frames based on a captured object that is detected at the frame image processing module, and a fourth sequence setting method of defining a set of substantially the same number of consecutive frames as the single original video sequence, and
    the video sequence setting module changes the number of frames to be included in the set of consecutive frames according to an increase or a decrease in a touch time of the user sensed at the touch sensing module or an increase or a decrease in a touch pressure of the user, or changes the number of frames to be included in the set of consecutive frames according to an increase or a decrease in a shake time of the device sensed at the motion sensing module or an increase or a decrease in a shake intensity;
    a video sequence shuffling module configured to create shuffled video content by randomly shuffling a subset video sequence including at least a portion of a k-th original video sequence to follow after a (k+1)-th original video sequence or to precede a (k−1)-th original video sequence, k denoting an integer greater than or equal to 1 and less than or equal to n−1; and
    a shuffled video content storage module configured to store sequence arrangement information that is information about the shuffled video content or arrangement order of video sequences of the shuffled video content and the subset video sequence;
    a video frame removing module configured to remove a portion of frames so that a run time of the shuffled video content meets a target run time; and
    a run time setting module configured to set the target run time of the shuffled video content,
    wherein the video frame removing module is configured to remove frames having the frame correlation greater than or equal to a third setting value from the k-th original video sequence or the subset video sequence to meet the target run time.

2. The system of claim 1, further comprising:
    the frame image processing module configured to perform an image analysis for each of the frames and to detect a captured object included in the frame,
    wherein the video sequence setting module is configured to define, as the single original video sequence, consecutive frames based on the captured object that is detected at the frame image processing module.

3. The system of claim 1, further comprising:
    the frame image processing module configured to detect camera adjustment frames that are frames captured during a camera movement or frames captured during a camera rotation,
    wherein the video sequence setting module is configured to define, as the single original video sequence, consecutive frames based on the camera adjustment frames that are detected at the frame image processing module.

4. The system of claim 1, wherein the video sequence setting module is configured to define a set of the random number of consecutive frames as the single original video sequence.

5. The system of claim 1, wherein the video sequence setting module is configured to define that each of the original video sequences includes a set of substantially the same number of consecutive frames.

6. The system of claim 1,
    wherein the video sequence setting module is further configured to use one or a combination of a first sequence setting method of defining, as the single original video sequence, consecutive frames based on a captured object that is detected at the frame image processing module, and a second sequence setting method of defining, as the single original video sequence, consecutive frames based on camera adjustment frames that are detected at the frame image processing module.

7. The system of claim 1, wherein the video sequence setting module is configured to divide a plurality of original video contents into the first original video sequence to the n-th original video sequence, and
    the video sequence shuffling module is configured to create the single piece of shuffled video content.

8. The system of claim 1, wherein the frame image processing module is configured to analyze each frame of the original video content in response to receiving the video edit activation input from the input interface module, and to calculate a frame correlation that is a correlation between consecutive frames, and the video sequence setting module is configured to define a set of consecutive frames having the frame correlation greater than or equal to a first setting value as the single original video sequence.

9. The system of claim 8, further comprising:
a video sequence removing module configured to remove at least one of original video sequences having a sequence correlation greater than or equal to a second setting value, the sequence correlation being a correlation between the original video sequences.

10. The system of claim 1, further comprising:
the frame image processing module configured to detect camera adjustment frames that are frames captured during a camera movement or frames captured during a camera rotation; and
the video frame removing module configured to remove, from the k-th original video sequence or the subset video sequence, a camera adjustment frame that is a video frame captured during the camera movement or a frame captured during the camera rotation as an operation result of the frame image processing module.

11. A method of editing video contents automatically, the method comprising:
a first step of receiving, by an automatic video content editing system, a video edit activation input from a user and loading original video content, wherein the automatic video content editing system receives a touch of a user on a display or a shake of the device as the video edit activation input;
a second step of defining, by the automatic video content editing system, a set of consecutive frames as a single original video sequence and dividing the original video content into a first original video sequence to an n-th original video sequence, n denoting an integer greater than or equal to 2, wherein the automatic video content editing system is configured to define that the original video sequences include a set of the random number of consecutive frames, or the original video sequences include a set of substantially the same number of consecutive frames;
the automatic video content editing system is configured to change the number of frames to be included in the set of consecutive frames according to an increase or a decrease in a touch time of the user or an increase or a decrease in a touch pressure of the user, or change the number of frames to be included in the set of consecutive frames according to an increase or a decrease in a shake time of the device or an increase or a decrease in a shake intensity;
a third step of randomly shuffling, by the automatic video content editing system, a subset video sequence including at least a portion of a k-th original video sequence to follow after a (k+1)-th original video sequence or to precede a (k−1)-th original video sequence, and creating sequence arrangement information that is information about arrangement order of the original video sequences and/or the subset video sequences; and
a fourth step of storing, by the automatic video content editing system, the shuffled video content corresponding to the sequence arrangement information or the sequence arrangement information;
the method further comprising:
a seventh step of setting, by the automatic video content editing system, setting a target run time of the shuffled video content after the first step;
an eighth step of analyzing, by the automatic video content editing system, each frame of the original video content in response to receiving the video edit activation input, and calculating a frame correlation that is a correlation between consecutive frames; and
a ninth step of removing, by the automatic video content editing system, frames having the frame correlation greater than or equal to a third setting value from the k-th original video sequence or the subset video sequence to meet the target run time.

12. The method of claim 11, wherein the second step comprises:
a first sub-step of performing, by the automatic video content editing system, an image analysis for each of the frames and detecting a captured object included in the frame; and
a second sub-step of defining, by the automatic video content editing system, consecutive frames based on the captured object that is detected in the first sub-step as the single original video sequence.

13. The method of claim 11, wherein the second step comprises:
a third sub-step of detecting, by the automatic video content editing system, camera adjustment frames that are frames captured during a camera movement or frames captured during a camera rotation; and
a fourth sub-step of defining, by the automatic video content editing system, consecutive frames based on the camera adjustment frames that are detected in the first sub-step as the single original video sequence.

14. The method of claim 11, wherein the first step is configured such that the automatic video content editing system loads a plurality of original video contents,
the second step is configured such that the automatic video content editing system divides the plurality of original video contents into the first original video sequence to the n-th original video sequence, and
the third step is configured such that the automatic video content editing system creates the single piece of shuffled video content.

15. The method of claim 11, wherein the second step comprises:
a fifth sub-step of analyzing, by the automatic video content editing system, each frame of the original video content, and calculating a frame correlation that is a correlation between consecutive frames; and
a sixth sub-step of defining, by the automatic video content editing system, a set of consecutive frames having the frame correlation greater than or equal to a first setting value as the single original video sequence.

* * * * *